(12) United States Patent
Sfar et al.

(10) Patent No.: US 8,908,624 B2
(45) Date of Patent: Dec. 9, 2014

(54) METHOD AND APPARATUS FOR A TWO-WAY RELAYING SCHEME WITH PHYSICAL LAYER NETWORK CODING

(75) Inventors: Sana Sfar, Atlantic Highlands, NJ (US); Weimin Liu, Chatham, NJ (US); Philip J. Pietraski, Huntington Station, NY (US); Rui Yang, Greenlawn, NY (US); Zhemin Xu, Pleasanton, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 297 days.

(21) Appl. No.: 13/503,258

(22) PCT Filed: Oct. 22, 2010

(86) PCT No.: PCT/US2010/053819
§ 371 (c)(1),
(2), (4) Date: Aug. 1, 2012

(87) PCT Pub. No.: WO2011/050301
PCT Pub. Date: Apr. 28, 2011

(65) Prior Publication Data
US 2012/0300692 A1 Nov. 29, 2012

Related U.S. Application Data

(60) Provisional application No. 61/254,178, filed on Oct. 22, 2009.

(51) Int. Cl.
| | | |
|---|---|---|
| *H04W 4/00* | (2009.01) | |
| *H04L 27/34* | (2006.01) | |
| *H04L 1/16* | (2006.01) | |
| *H04B 7/155* | (2006.01) | |
| *H04L 1/00* | (2006.01) | |
| *H04B 7/26* | (2006.01) | |

(52) U.S. Cl.
CPC ......... *H04L 27/34* (2013.01); *H04L 2001/0097* (2013.01); *H04B 7/2656* (2013.01); *H04L 1/1607* (2013.01); *H04B 7/2606* (2013.01); *H04B 7/15521* (2013.01)
USPC ............................ 370/329; 370/315; 370/328

(58) Field of Classification Search
USPC .................................................. 370/315, 328
See application file for complete search history.

(56) References Cited

U.S. PATENT DOCUMENTS

| 8,005,051 B2 | 8/2011 | Watanbe | |
|---|---|---|---|
| 2006/0120482 A1* | 6/2006 | Park et al. ..................... | 375/298 |

(Continued)

FOREIGN PATENT DOCUMENTS

| JP | 5259956 A2 | 10/1993 |
|---|---|---|
| JP | 2009135928 A2 | 6/2009 |

(Continued)

OTHER PUBLICATIONS

Bergmans et al., "Cooperative Broadcasting," IEEE Transactions on Information Theory, vol. 20, No. 3, pp. 317-324 (May 1974).

(Continued)

*Primary Examiner* — Kibrom T Hailu
*Assistant Examiner* — Zewdu A Beyen
(74) *Attorney, Agent, or Firm* — Volpe and Koenig, P.C.

(57) ABSTRACT

A two-way relay wireless communication method and device may combine multiple bit steams, for one source node and two target nodes, and broadcasting a network coded combined bit sequence to reduce the number of time slots for transmission. A first device may receive a signal from the source node and a target node simultaneously in a time slot. The first device may receive subsequent signals from the source node and multiple target nodes simultaneously in successive time slots. Hierarchical modulation may be applied to the received signals. The first device may decode the received signals and generate a plurality of intermediate bit sequences (IBS)s for a broadcast transmission. The generated IBSs may be grouped according to a channel condition. A second device may be configured to receive the broadcast transmission and decode a portion of the broadcast transmission that is intended for the second device.

16 Claims, 19 Drawing Sheets

(56) References Cited

U.S. PATENT DOCUMENTS

2010/0124186 A1* 5/2010 Josiam et al. ................ 370/315
2010/0246708 A1 9/2010 Horiuchi et al.

FOREIGN PATENT DOCUMENTS

WO 2009/066451 5/2009
WO 2009/066451 A1 5/2009

OTHER PUBLICATIONS

Chou et al., "Network Coding for the Internet and Wireless Networks," Multiterminal Communication Systems, IEEE Signal Processing Magazine, pp. 77-85 (Sep. 2007).
Cui et al., "Space-Time Communication Protocols for N-way Relay Networks," IEEE Global Telecommunications Conference, pp. 1-5 (Nov. 30-Dec. 4, 2008).
Ding et al., "On the Study of Network Coding with Diversity," IEEE Transactions on Wireless Communications, vol. 8, Issue 3, pp. 124-1259 (Mar. 2009).
Esli et al., "Multiuser MIMO Two-way Relaying for Cellular Communications," IEEE 19th International Symposium on Personal, Indoor and Mobile Radio Communications, pp. 1-6 (Sep. 2008).
Feng et al., "Enhanced Bidirectional Relaying Schemes for Multi-hop Communications," IEEE Global Telecommunications Conference, pp. 1-6 (Nov. 30-Dec. 4, 2008).
Fu et al., "Cooperative Network Coding for Wireless Ad-Hoc Networks," IEEE Global Telecommunications Conference, pp. 812-816 (Nov. 2007).
Katti et al., "XORs in the Air: Practical Wireless Network Coding," SIGCOMM '06 (Sep. 11-15, 2006).
Koike-Akino et al., "Denoising Maps and Constellations for Wireless Network Coding in Two-Way Relaying Systems," IEEE Global telecommunications Conference, pp. 1-5 (Nov. 30-Dec. 4, 2008).
Koike-Akino et al., "Optimized Constellations for Two-Way Wireless Relaying with Physical Network Coding," IEEE Journal on Selected Areas in Communications, vol. 27, No. 5 (Jun. 2009).
Liang et al., "Optimal Analogue Relaying with Multi-Antennas for Physical Layer Network Coding," IEEE International Conference on Communications, pp. 3893-3897 (May 2008).
Popovski et al., "Bi-Directional Amplification of Throughput in a Wireless Multi-Hop Network," IEEE 63rd Vehicular Technology Conference, vol. 2, pp. 588-593 (May 7-10, 2006).
Popovski et al., "Physical Network Coding in Two-Way Wireless Relay Channels," IEEE International Conference on Communications, pp. 707-712 (Jun. 24-28, 2007).
Popovski et al., "The Anti-Packets Can Increase the Achievable Throughput of a Wireless Multi-Hop Network," IEEE International Conference on Communications, vol. 9, pp. 3885-3890 (Jun. 11-15, 2006).
Rankov et al., "Achievable Rate Regions for the Two-way Relay Channel," IEEE International Symposium on Information Theory, pp. 1668-1672 (Jul. 9-14, 2006).
Ryu et al., "Dual Constellation Diversity-Enhanced Modulation for Network-Coded Bidirectional Relaying in an Assymmetric Channel," IEEE 20$^{th}$ International Synposium on Personal, Indoor and Mobile Radio Communications, pp. 2375-2379 (Sep. 13, 2009).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.7.0 (May 2009).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.1.0 (Mar. 2011).
Unger et al., "Linear Transceive Filters for Relay Stations with Multiple Antennas in the Two-Way Relay Channel," 16th IST Mobile and Wireless Communications Summit, pp. 1-5 (Jul. 2007).
Wu et al., "Information Exchange in Wireless Networks with Network Coding and Physical-Layer Broadcast," Microsoft Technical Report, MSR-TP-2004-78, (Aug. 2004).
Xu et al., "Partial-Differential Distributed Cyclic Delay Diversity for Nonregenerative Two-Way Relaying System," IEEE Signal Processing Letters, vol. 16, Issue 7, pp. 596-599 (Jul. 2009).
Yuen et al., "Bi-Directional Multi-Antenna Relay Communications with Wireless Network Coding," IEEE Vehicle Technology Conference, pp. 1385-1388 (May 2008).
Zhang et al., "Physical-Layer Network Coding," ACM Mobicom '06 (Sep. 2006).
Ryu et al, Dual Constellation diversity-enhanced modulation for network-coded bidirectional relaying in an asymmetric channel, IEEE 20th International Symposium on Personal, Indoor and Mobile Radio Communications, PIMRC 2009, Sep. 13, 2009, pp. 2375-2379, XP031659755, ISBN: 978-1-4244-5122-7, IEEE, Piscataway, NJ.
Koike-Akino T et al, Optimized Constellations for Two-way Wireless Relaying with Physical Network Coding, IEEE Journal on Selected Areas in Communications, Jun. 1, 2009, pp. 773-787, vol. 27, No. 5 XP011262311, ISSN: 0733-8716, IEEE Service Center, Piscataway, NJ.

* cited by examiner

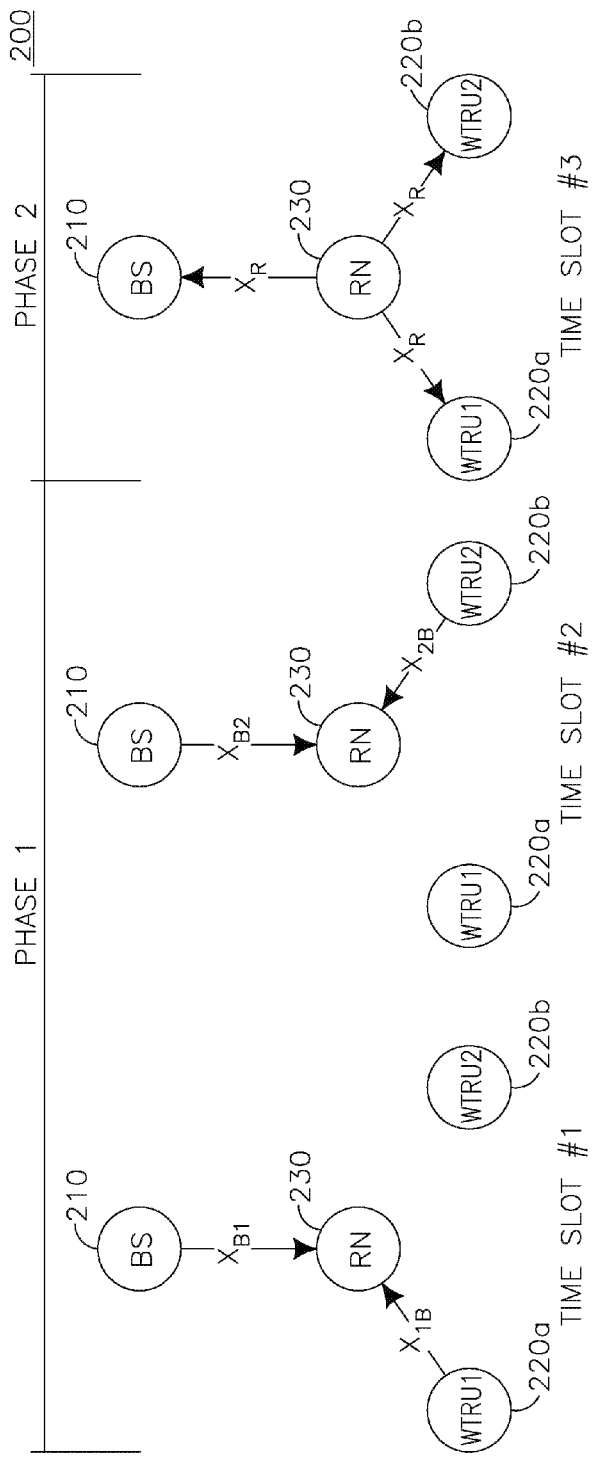
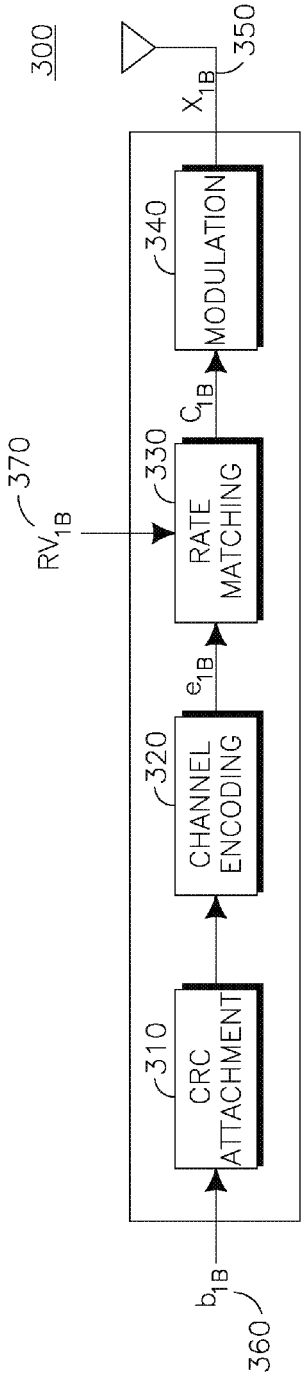
FIG. 2
FIG. 3

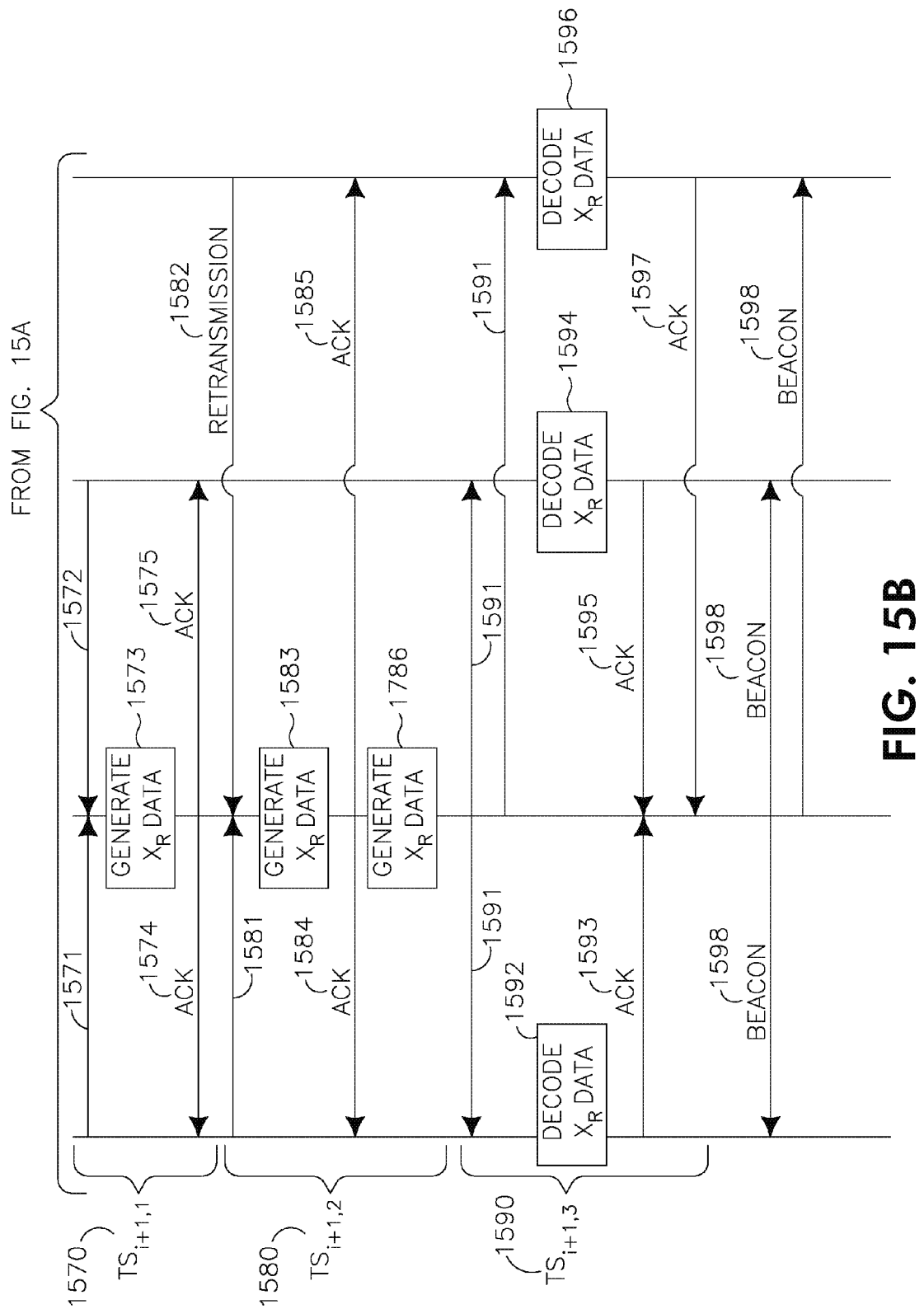

METHOD AND APPARATUS FOR A TWO-WAY RELAYING SCHEME WITH PHYSICAL LAYER NETWORK CODING

CROSS REFERENCE TO RELATED APPLICATIONS

This application claims the benefit of U.S. Provisional Application No. 61/254,178 filed on Oct. 22, 2009 and PCT Application No. PCT/US10/053819 filed on Oct. 22, 2010, the contents of which are hereby incorporated by reference.

BACKGROUND

Relays may be used in LTE-A to enhance coverage and capacity and offer more flexible deployment options. A relay node (RN) may create new cells, distinguishable and separate from the cells of a donor-evolved NodeB (eNB), where the donor-eNB may support a Un interface to support eNB to RN communication. To any legacy wireless transmit/receive unit (WTRU), an RN may appear as an eNB. That is, the presence of an RN in its communication path to the donor-eNB may be transparent to the WTRU. An RN may be an eNB that has a wireless in-band backhaul link back to the donor-eNB by using an LTE or LTE-A air interface within the International Mobile Telecommunications (IMT) spectrum allocation.

A two-way communications system with two transceivers and one relay node may take four time slots to complete a message exchange, assuming time division duplex (TDD) half duplex mode and no direct link between two transceivers. It would be desirable to have a method and apparatus for implementing a relay scheme that may use a lower number of time slots and may also have a low level of complexity.

SUMMARY

A two-way relay wireless communication method and device may combine multiple bit steams, for one source node and two target nodes, and broadcasting a network coded combined bit sequence to reduce the number of time slots for transmission. A first device may receive a signal from the source node and a target node simultaneously in a time slot. The first device may receive subsequent signals from the source node and multiple target nodes simultaneously in successive time slots. Hierarchical modulation may be applied to the received signals. The first device may decode the received signals and generate a plurality of intermediate bit sequences (IBS)s for a broadcast transmission. The generated IBSs may be grouped according to a channel condition.

A second device may transmit a signal in a first time slot and receive a broadcast signal in a second time slot. The broadcast signal may include network coded data for one or more target nodes. The second device may be configured to decode a portion of the broadcast signal that is intended for the second device.

BRIEF DESCRIPTION OF THE DRAWINGS

A more detailed understanding may be had from the following description, given by way of example in conjunction with the accompanying drawings wherein:

FIG. 2 is a diagram of an example two-way relaying scheme;

FIG. 3 is a diagram of an example WTRU1 transmitter;

FIGS. 15a and 15b are a signal diagram of an example two-way relay transmission where one downlink transmission fails;

DETAILED DESCRIPTION

Figure 1A:
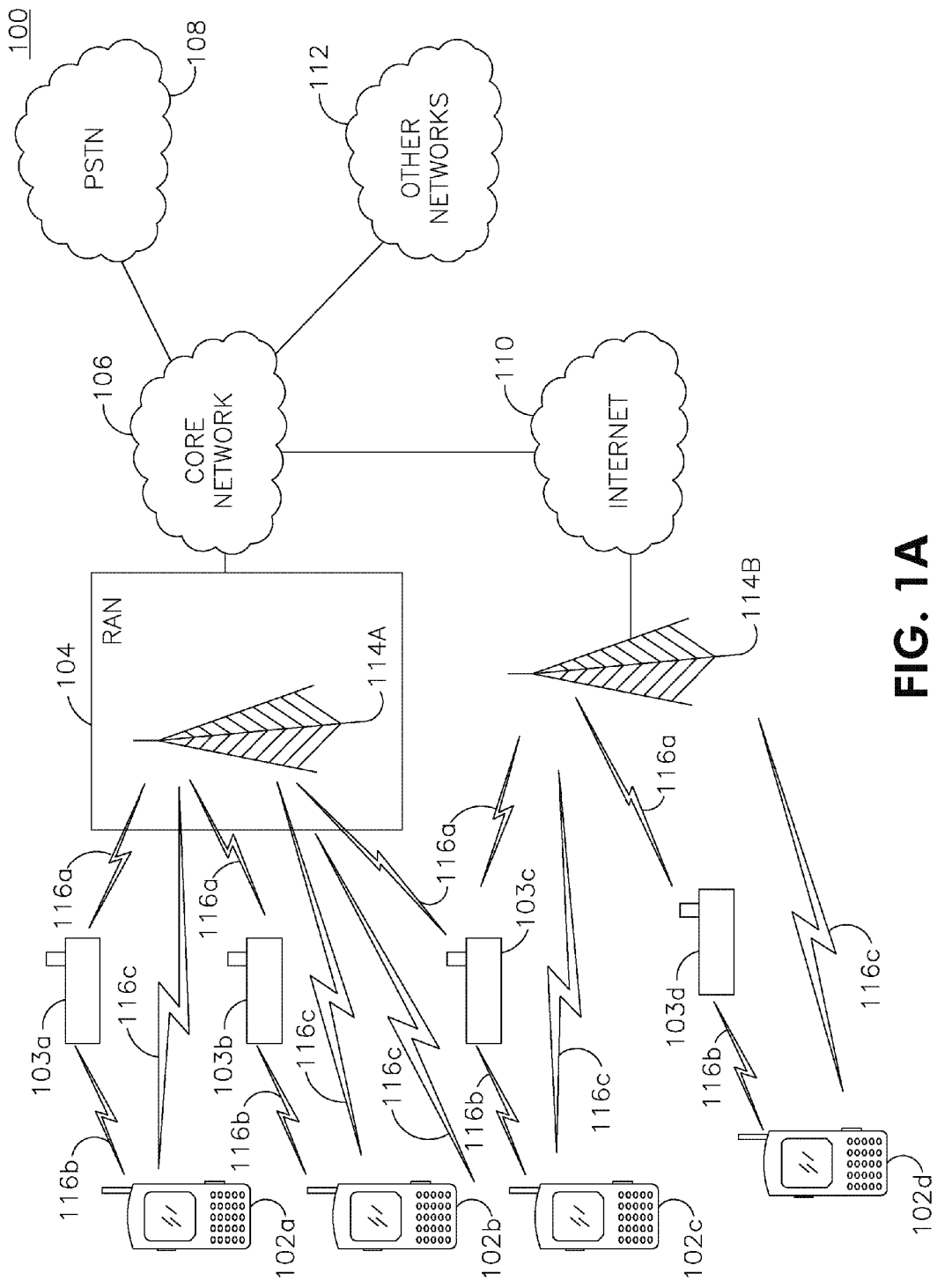
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRU)s 102a, 102b, 102c, 102d, relay nodes (RN)s 103a, 103b, 103c, 103d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. In some embodiments, the communication system 100 may comprise of all WTRUs, BSs, RNs, or any wireless device that may receive and transmit data.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the RNs 103a, 103b, 103c, 103d over an air interface 116a, which may be any suitable wireless communication link (e.g., radio frequency (RF), microwave, infrared (IR), ultraviolet (UV), visible light, etc.). The air interface 116a may be established using any suitable radio access technology (RAT).

The RNs 103a, 103b, 103c, 103d may communicate with one or more of the WTRUs 102a, 102b, 102c, 102d over an air interface 116b, which may be any suitable wireless communication link (e.g., radio frequency (RF), microwave, infrared (IR), ultraviolet (UV), visible light, etc.). The air interface 116b may be established using any suitable radio access technology (RAT).

The base stations 114a, 114b may communicate with one or more of the WTRUs 102a, 102b, 102c, 102d over an air interface 116c, which may be any suitable wireless communication link (e.g., radio frequency (RF), microwave, infrared (IR), ultraviolet (UV), visible light, etc.). The air interface 116c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104, the WTRUs 102a, 102b, 102c, and the RNs 103a, 103b, 103c, may implement a radio technology such as Universal Mobile Telecommunications System (UMTS) Terrestrial Radio Access (UTRA), which may establish the air interfaces 116a, 116b, 116c using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a, the WTRUs 102a, 102b, 102c, and the RNs 103a, 103b, 103c, may implement a radio technology such as Evolved UMTS Terrestrial Radio Access (E-UTRA), which may establish the air interfaces 116a, 116b, 116c using Long Term Evolution (LTE) and/or LTE-Advanced (LTE-A).

In other embodiments, the base station 114a, the WTRUs 102a, 102b, 102c, and the RNs 103a, 103b, 103c, may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A is a source node and may be a wireless router, a Home Node B, a WTRU, a Home eNode B, or an access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b, the WTRUs 102c, 102d, and the RNs 103c, 103d, may implement a radio technology such as IEEE 802.15 to establish a wireless personal area network (WPAN). In yet another embodiment, the base station 114b, the WTRUs 102c, 102d, and the RNs 103c, 103d, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
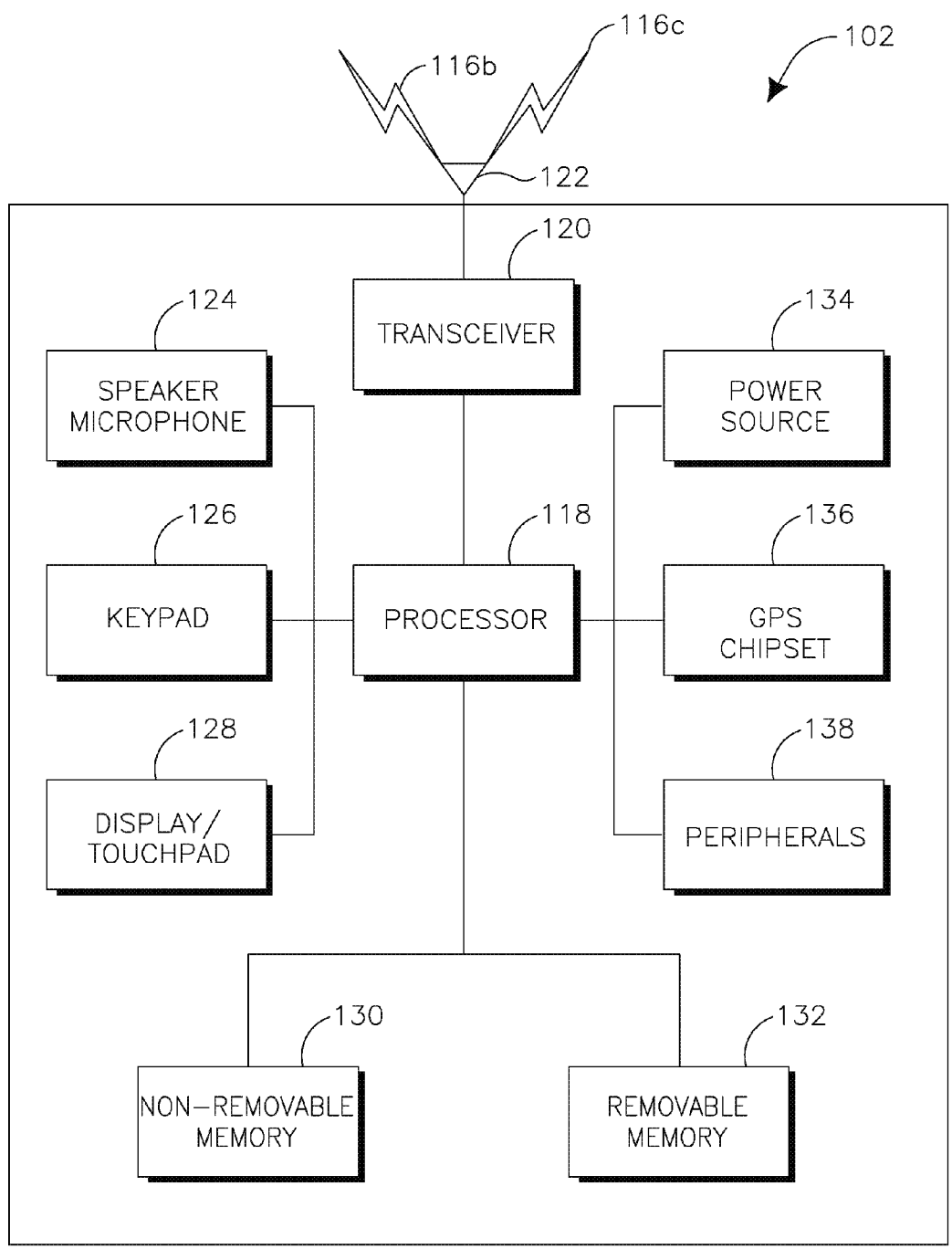
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. The WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) or an RN over the air interfaces 116b, 116c. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interfaces 116b, 116c.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
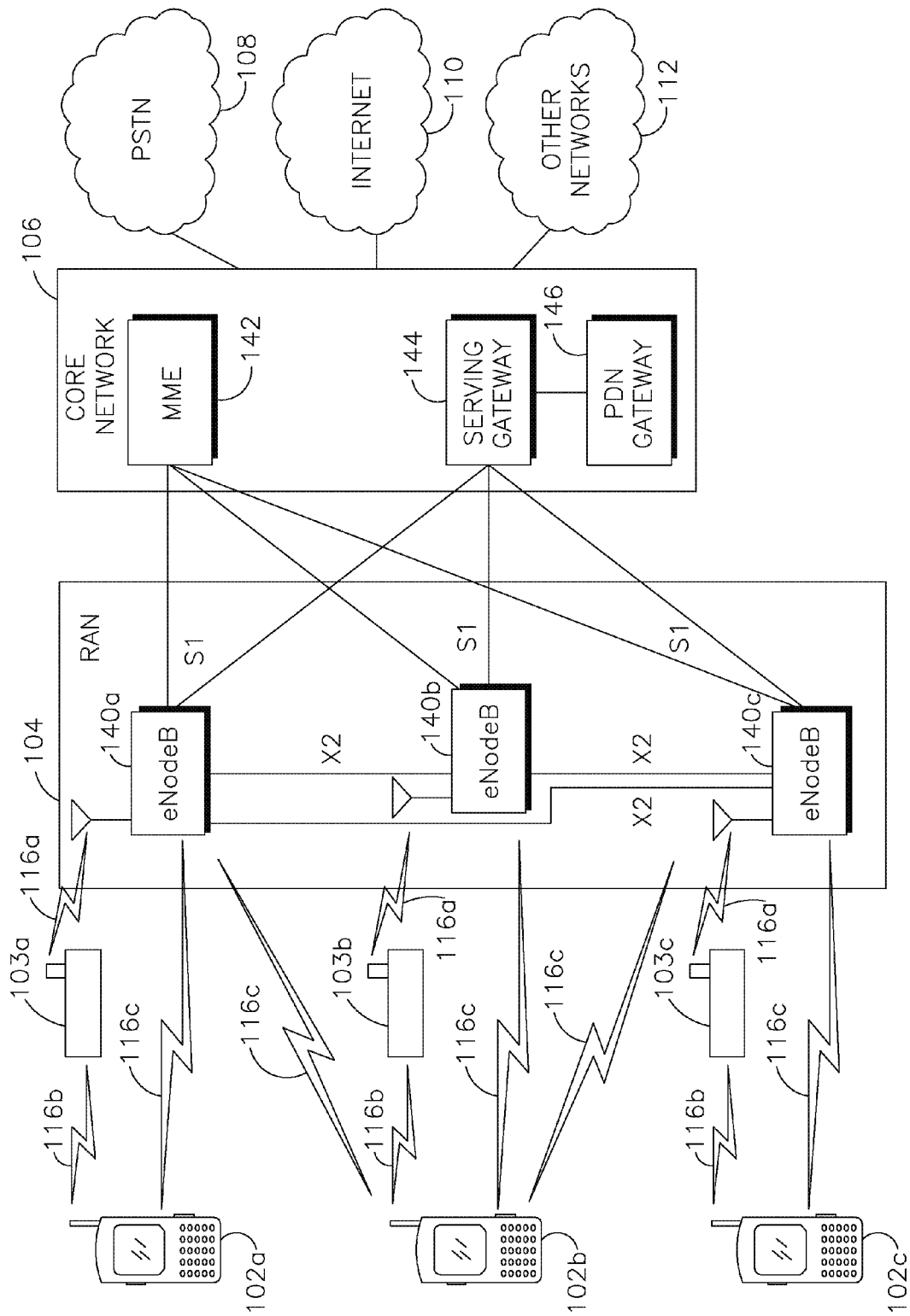
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116c and/or with RNs 103a, 103b, 103c over the air interface 116a. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116c and/or with RNs 103a, 103b, 103c over the air interface 116a. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The RNs 103a, 103b, 103c, may communicate with one or more of the WTRUs 102a, 102b, 102c, over an air interface 116b, which may be any suitable wireless communication link (e.g., radio frequency (RF), microwave, infrared (IR), ultraviolet (UV), visible light, etc.). The air interface 116b may be established using any suitable radio access technology (RAT).

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MMME 142 may be responsible for authenticating users of the WTRUs 102a, 102b, 102c, bearer activation/deactivation, selecting a particular serving gateway during an initial attach of the WTRUs 102a, 102b, 102c, and the like. The MMME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

When referred to herein, downlink (DL) may refer to a transmission from any tranceiver to an RN. When referred to herein, uplink (UL) may refer to a transmission from an RN to any transceiver.

An example two-way relaying scheme may employ a single antenna at each receiver and perform half-duplex transmission in time. For each transceiver, transmission and reception of data may occur in different time slots. The example two-way relaying scheme may not have direct links between the BS and the WTRUs, or among the WTRUs themselves. The BS and the WTRUs may all use the same frequency band, in the UL and the DL, without code or space multiplexing. The BS and the WTRUs may transmit data packets of the same size, and have perfect knowledge of channel state information (CSI) for maximum-likelihood (ML) and hierarchical modulation (HM) decoding.

A two-way relaying scheme may use physical-layer network coding (PNC) that includes a decode-and-forward scheme, where bits from different sources may be hard-decoded at the receiver of the RN. Network coding may be performed at the bit level using exclusive-OR (XOR) network coding. The PNC scheme may use N+1 time slots for N WTRUs. In this example, one slot may be used for each BS-WTRU pair and one slot for broadcast by the RN. Quadrature Amplitude Modulation (QAM) may be used in the DL direction in which the BS and the WTRUs transmit to the RN. HM may be used in the RN broadcast phase based on relative SINRs, for example, where bits may be destined for a high SINR node are coded as LSBs, and bits destined for a low SINR node may be coded as MSBs.

FIG. 2 is a diagram of an example two-way relaying scheme 200 that may combine multiple bit steams, for one BS 210 and two WTRUs 220a, 220b, using HM and broadcasting a network coded combined bit sequence to reduce the number of time slots for transmission. Three time slots may be used for each relaying cycle. A relaying cycle may begin when an RN broadcasts a beacon and end when the RN broadcasts a subsequent beacon. $X_{AB}$ may be used to describe the signal transmitted from node A to node B, and $b_{AB}$ as the bit sequence of signal $X_{AB}$. In time slot 1, the BS 210 and WTRU1 220a may transmit simultaneously to the RN 230. The RN 230 may demodulate and decode the superimposition of $X_{1B}$ and $X_{B1}$ at the receiver using maximum-likelihood (ML) to generate the bit sequences $\{b_{1B}\}$ and $\{b_{B1}\}$ and form a first intermediate bit sequence (IBS), for example, $b_{R1}=XOR(b_{1B}, b_{B1})$.

In time slot 2, the BS 210 and WTRU2 220b may simultaneously transmit to the RN 230. The RN 230 may demodulate and decode the superimposition of $X_{2B}$ and $X_{B2}$ at the receiver using ML to generate the bit sequences $\{b_{2B}\}$ and $\{b_{B2}\}$ and form a second IBS, for example, $b_{R2}=XOR(b_{2B}, b_{B2})$. The RN 230 may further prepare for HM by forming $X_R=HM(b_{R1}, b_{R2})$, or $X_R=HM(b_{R2}, b_{R1})$ based on relative Signal to Interference plus Noise Ratios (SINR)s between signals received from WTRU1 220a and WTRU2 220b. In HM, a modulation order generally higher than that for $X_{nB}$ and $X_{Bn}$ may be used for $X_R$. For example, if $X_{nB}$ and $X_{Bn}$ are transmitted using QPSK, $X_R$ may be transmitted using 16-QAM. If the SINR for the RN 230 to WTRU1 220a transmission is higher than that for RN 230 to WTRU2 220b transmission, bra may be assigned to the LSB, and $b_{R2}$ may be assigned to the MSB, and vice versa.

In time slot 3, the RN 230 may broadcast $X_R$ to all parties, for example the BS 210, WTRU1 220a, and WTRU2 220b, by hierarchically modulating $(b_{R1}, b_{R2})$ or hierarchically modulating $(b_{R2}, b_{R1})$. The BS 210 may demodulate $X_R$, obtain $b_{R2}$, $b_{R1}$ and then generate $b_{1B}=XOR(b_{R1}, b_{B1})$ and $b_{2B}=XOR(b_{R2}, b_{B2})$. Since $b_{B1}$ and $b_{B2}$ were transmitted by the BS 210, $b_{B1}$ and $b_{B2}$ are therefore known to the BS 210. WTRU1 220a, assuming $b_{R1}$ as LSB, may demodulate $X_R$, discard $b_{R2}$, and obtain $b_{B1}=XOR(b_{R1}, b_{1B})$. This may be possible because $b_{1B}$ is known to WTRU1 220a. Note that $b_{R2}$ may be undecipherable to WTRU1 220a. WTRU2 220b, assuming $b_{R2}$ as MSB, may partially demodulate $X_R$ and obtain $b_{B2}=XOR(b_{R2}, b_{2B})$.

This may be possible because $b_{2B}$ is known to WTRU2 220b. Note that bra may be undecipherable to WTRU2 220b even if the SINR is acceptable for WTRU2 220b to decode it.

In time slots 1 and 2 in the above two-WTRU example, the BS 210 and one WTRU may transmit to the RN 230 simultaneously. This direction is designated as DL, and it may involve the transmitters at the BS 210, WTRUs 220a, 220b, and the receiver at the RN 230.

FIG. 3 is a diagram of an example WTRU1 transmitter 300. The transmitter 300 may comprise a CRC attachment unit 310, a channel encoding unit 320, a rate matching unit 330, a modulation unit 340, and an antenna 350. The transmitters in the BS and other WTRUs may be identical, except for the signal notations. The bit stream 360 destined to the BS from WTRU1 may be denoted as $b_{1B}$, and the signal after modulation may be $X_{1B}$. Note that it may be possible to select only a portion of the encoded bits to be transmitted, as specified by a Redundancy Version (RV) 370.

The CRC attachment unit 310 may receive a bit stream 360 and attach CRC bits to the bit stream 360. The bit stream 360 may be forwarded to the channel encoding unit 320 before being forwarded to the rate matching unit 330. The rate matching unit 330 may forward a coded bit sequence to the modulation unit 340. The modulation unit 340 may modulate the coded bit sequence and generate a packet $X_{1B}$ comprising of k symbols. Each symbol may be modulated, for example, using M-ary modulation. $x^k$ may be the $k^{th}$ symbol of packet x, where k=1, 2, . . . , k.

An example of a BS transmitter may be shown by modifying FIG. 3 to replace the signal subscript 1B with B1 when transmitting to WTRU1, and B2 when transmitting to WTRU2, etc. An example of a WTRU2 transmitter may be shown by modifying FIG. 3 to replace the signal subscript 1B with 2B.

Figure 4:
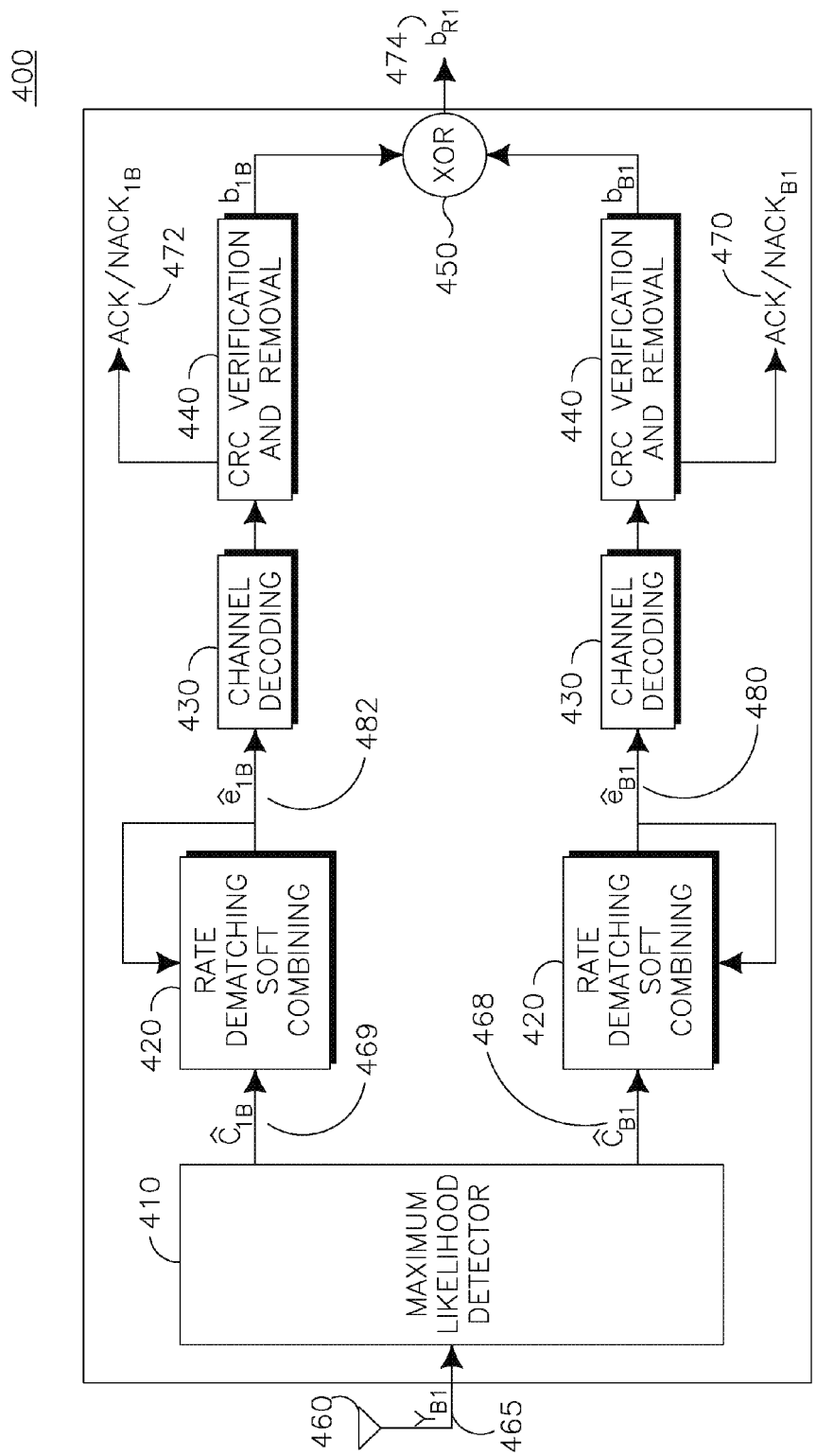
FIG. 4 is a diagram of a general structure of an RN receiver.

FIG. 4 is a diagram of a general structure of an RN receiver 400. The RN receiver 400 may include an ML detector 410, a Successive Interference Cancellation (SIC) detector (not shown), and/or any other detector that may enable the detection of multiple signals, one or more rate dematching/soft combining units 420, one or more channel decoding units 430, one or more CRC verification and removal units 440, an IBS generator 450, and an antenna 460. The downlink transmissions $X_{B1}$ and $X_{1B}$ from the BS and WTRU1 may be superimposed on each other and received by the RN as $Y_{B1}$ 465. With the knowledge of the channel information, the RN may decode $Y_{B1}$ 465 using the ML detector 410 to produce the soft bit estimate of $c_{B1}$ and $c_{1B}$, denoted as $\hat{c}_{B1}$ 468 and $\hat{c}_{1B}$ 469, which may be combined with those from one or more previous transmissions, if any, before being rate-dematched and decoded.

After processing the received signals, the RN may generate estimates of two packets, and the corresponding bit sequences. A rate dematching/soft combining unit 420 and channel decoding unit 430 may then be applied to the corresponding bit sequences separately, and the resulting bit sequences, may be fed to the CRC verification and removal unit 440. The accumulated soft bits $\hat{e}_{B1}$ 480 and $\hat{e}_{1B}$ 482 may also be preserved if the corresponding CRC is not valid. After passing CRC verification, the first IBS may be generated and processed for transmission. The outputs from the RN may be an ACK/NACK$_{B1}$ 470, an ACK/NACK$_{1B}$ 472, and an intermediate bit stream $b_{R1}$ 474. Similarly, in time slot 2, the same transmitting and receiving processes may occur in the BS, WTRU2, and the RN. The RN may produce an ACK/NACK$_{B2}$, an ACK/NACK$_{2B}$, and intermediate bit stream $b_{R2}$.

Figure 5:
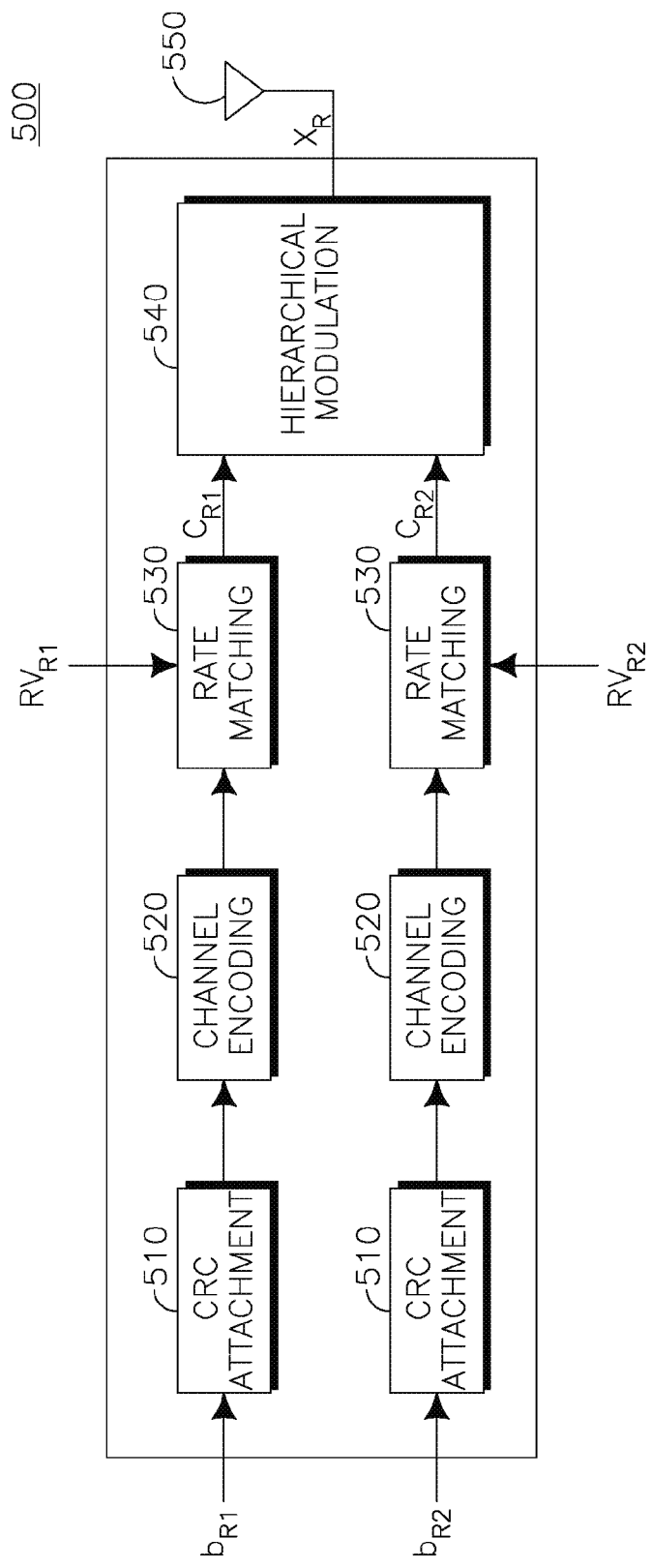
FIG. 5 is a diagram of a general structure of an RN transmitter.

In time slot 3, the RN may combine bit streams $b_{R2}$ and $b_{R1}$ using the reference model illustrated in FIG. 5. The RN transmitter 500 may include one or more CRC attachment units 510, one or more channel encoding units 520, one or more rate matching units 530, an HM unit 540, and an antenna 550. The RN may broadcast the hierarchically modulated signal $X_R$ to the BS and all WTRUs.

Hierarchical modulation may be applied in the RN transmitter at the HM unit 540. Based on the difference in channel quality towards WTRU1 and WTRU2, $b_{R2}$ and $b_{R1}$ may be coded into a combined constellation, at the channel encoding unit 520, such that the WTRU with the higher channel quality will have its data coded into the least significant bits (LSB)s of the constellation while the WTRU with the lower channel quality will have its data coded into the most significant bits (MSB)s. Note that RVs may be selected for $b_{R2}$ and $b_{R1}$ independently.

When retransmission is performed by the RN, HM may or may not be needed. In examples where a single packet, or paired packets ($b_{1B}$ and $b_{B1}$ or $b_{2B}$ and $b_{B2}$), are received in error, only the intermediate bits $b_{R1}$ or $b_{R2}$ may be retransmitted. The chance for successful retransmission, therefore, may improve due to the absence of hierarchical transmission.

At the end of time slot 2, the RN may process the received packets and set the Control Signals at Relay (CSR)s, which may be, for example, five bits long where CSR=(CSR[4], CSR[3], . . . , CSR[0]). The CSRs may serve as ACK/NACK signals for transmissions occurring in time slots 1 and 2, and RN operation status as well. By knowing the RN operation status, the BS and WTRUs may demodulate the signals and process the information bits from the RN in time slot 3. The CSRs may be assumed to be received by the BS and WTRUs perfectly.

The definition of CSR is described in Table 1.

TABLE 1

| | |
|---|---|
| CSR[0] | 0: $b_{B1}$ received unsuccessfully, 1: $b_{B1}$ received successfully; |
| CSR[1] | 0: $b_{1B}$ received unsuccessfully, 1: $b_{1B}$ received successfully; |
| CSR[2] | 0: $b_{B2}$ received unsuccessfully, 1: $b_{B2}$ received successfully; |
| CSR[3] | 0: $b_{2B}$ received unsuccessfully, 1: $b_{2B}$ received successfully; |
| CSR[4] | 1: Hierarchical modulation is applied if at least 1 packet in each time slot is successfully received and $\gamma_{1,3} > \gamma_{2,3}$, where $\gamma_{1,3}$ and $\gamma_{2,3}$ are the instantaneous received SINRs at WTRU1 and WTRU2, respectively. 0: No hierarchical modulation is applied. |

Based upon the received packets in time slot 1 and 2, the RN may generate two intermediate bit sequences (IBS)s, $b_{R1}$ and $b_{R2}$. Each IBS may have a length Q. $b_{R1}$ may be used as an example for illustration. $b_{R2}$ may be generated in the same way. If both packets are successfully received, then $b_{R1}{}^q = \text{XOR}(b_{B1}{}^q, b_{1B}{}^q)$, where q=1, 2 . . . Q. If $c_{B1}$ is the only packet received successfully, then $b_{R1} = b_{B1}$. If $b_{1B}$ is the only packet received successfully, then $b_{R1} = b_{1B}$. If both packets are not received successfully, then $b_{R1}$=NULL.

If both IBSs are NULL, for example when CSR=[00000], the RN may remain idle. If one of two IBSs is NULL, for example when CSR=[00001], [00010], [00100], [01000], [00011] or [01100], the RN may use the same M-ary PSK modulation as the previous two time slots. If neither of two IBSs are NULL, for example when CSR=[x0101], [x0110], [x1001], [x1010], [x0111], [x1011], [x1101], [x1110] or [x1111], the RN may apply the bit streams to an HM unit. For example, HM may be applied when at least one packet in each time slot is successfully received.

The order of HM may be 2M. For example, if QPSK is used in the previous two time slots, 16-QAM will be adopted for hierarchical modulation. The RN may group $g_{R,3l+1}$ and $g_{R,3l+2}$ according to the instantaneous received SINRs at WTRU1 and WTRU2, $\gamma_{1,3}$ and $\gamma_{2,3}$. The $k^{th}$ symbol, $x_R^k$, may be determined by the bit sequence, $\{b_{R,1}^{kM-M+1}, \ldots, b_{R,1}^{kM}, b_{R,2}^{kM-M+1}, \ldots, b_{R,2}^{kM}\}$ if $\gamma_{1,3} < \gamma_{2,3}$, or $\{b_{R,2}^{kM-M+1}, \ldots, b_{R,2}^{kM}, b_{R,1}^{kM-M+1}, \ldots, b_{R,1}^{kM}\}$ if $\gamma_{1,3} \geq \gamma_{2,3}$. The grouping may be performed such that a sequence with a low SINR may be easily modulated. The RN may apply HM based on an SNR level.

Figure 6:
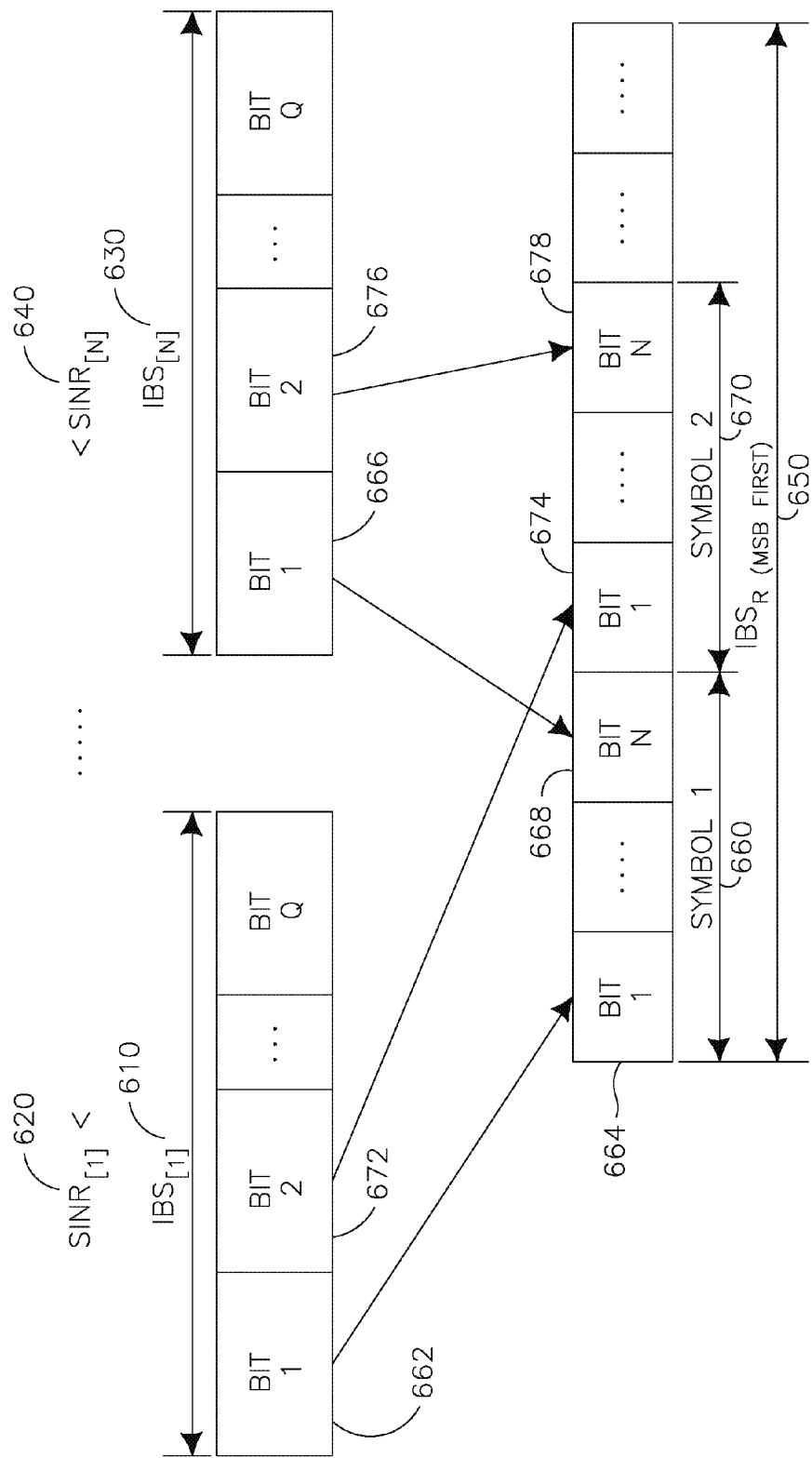
FIG. 6 is a diagram of an example intermediate bit sequence (IBS)

An example of a generated IBS is shown in FIG. 6. The RN may group the IBSs based on an SINR level. In this example, IBS$_{[1]}$ 610 may have the lowest SINR 620 and IBS$_{[N]}$ 630 may have the highest SINR 640. The RN may generate an IBS$_R$ 650 for broadcast by arranging the received bits from IBS$_{[1]}$ ... IBS$_{[N]}$ into symbols. For example, in symbol 1 660, the RN may use the first bit 662 of IBS$_{[1]}$ for the first bit 664 in symbol 1 660 and the first bit 666 in IBS$_{[N]}$ for the last bit 668 in symbol 1 660. For symbol 2 670, the RN may use the second bit 672 of IBS$_{[1]}$ for the first bit 674 in symbol 2 670 and the second bit 676 of IBS$_{[N]}$ for the last bit 678 in symbol 2 670.

Figure 7:
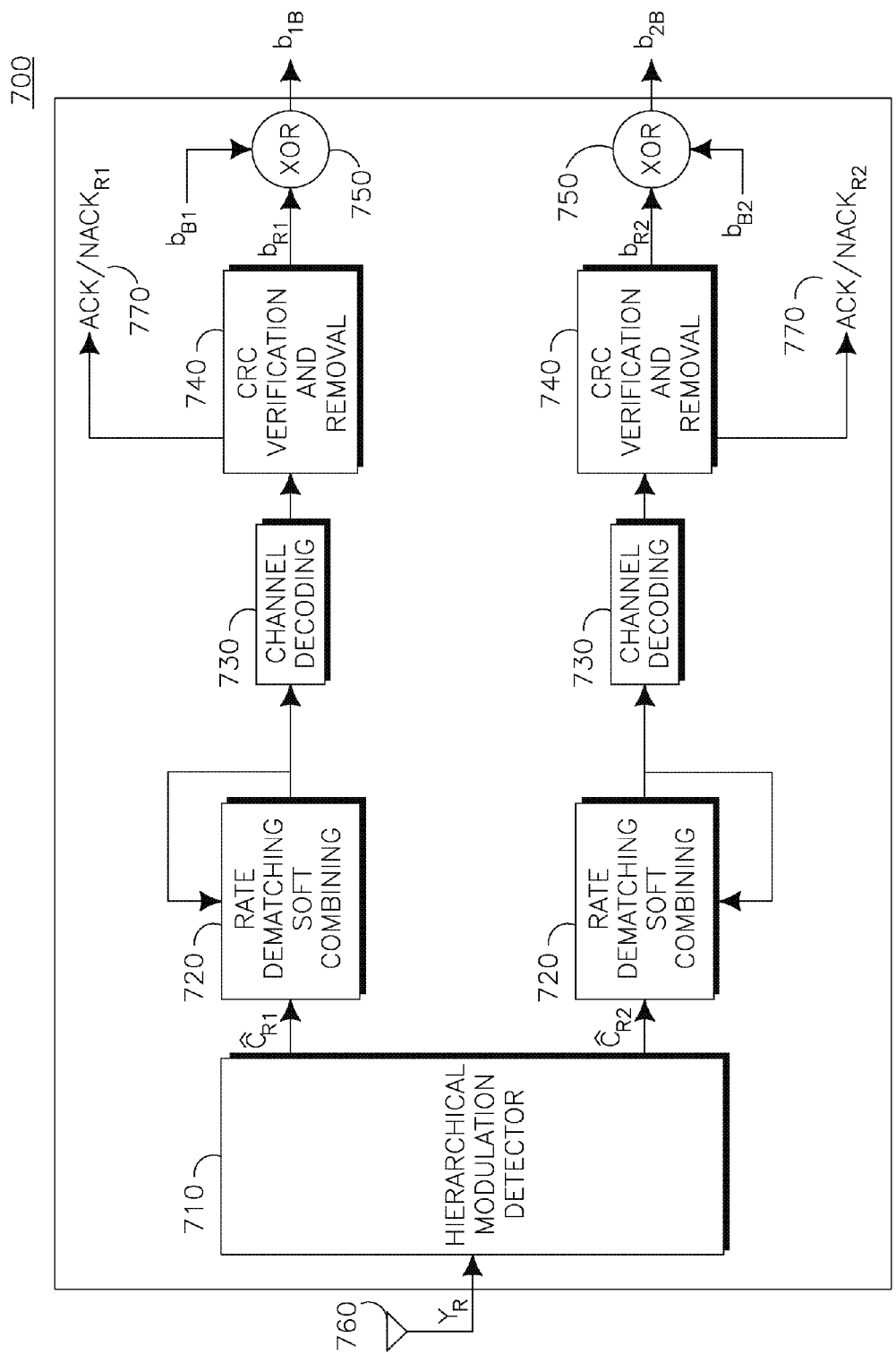
FIG. 7 is a diagram of a general structure of a base station (BS) receiver.

FIG. 7 is a diagram of an example BS receiver 700. The BS receiver may include an HM detector 710, one or more rate dematching/soft combining units 720, one or more channel decoding units 730, one or more CRC verification and removal units 740, one or more IBS generators 750, and an antenna 760. Upon receiving a signal, the HM detector 710 may estimate corresponding bit sequences, and apply them to a rate dematching/soft combining unit 720 and channel decoding unit 730 separately. The resulting bit sequences may be fed to the CRC verification and removal unit 740. The CRC verification and removal unit 740 may be configured to generate an ACK/NACK 770 that may be transmitted to one or more WTRUs via an RN. After passing CRC verification, the IBS generators 750 may generate corresponding IBSs process them for transmission.

The BS may decode the entire hierarchically modulated signal from the RN broadcast and extract $b_{R1}$ and $b_{R2}$. By performing an XOR operation on one or more previously transmitted bit streams, the BS may decode the bit streams intended for it. The output of the XOR operation between the received bits and the bits it transmitted may be the bit stream intended for the BS. If the bit stream was not received successfully by the RN, as indicated by an NACK from the RN, all zero bits or a pseudo random bit sequence may be used in the XOR operation. The BS may not know whether a particular downlink transmission had been successful if an ACK or a NACK is not received for any downlink transmission. In this scenario, the BS may blindly decode for both cases, and may deem whichever yields a valid CRC to be the desired data packet.

Figure 8:
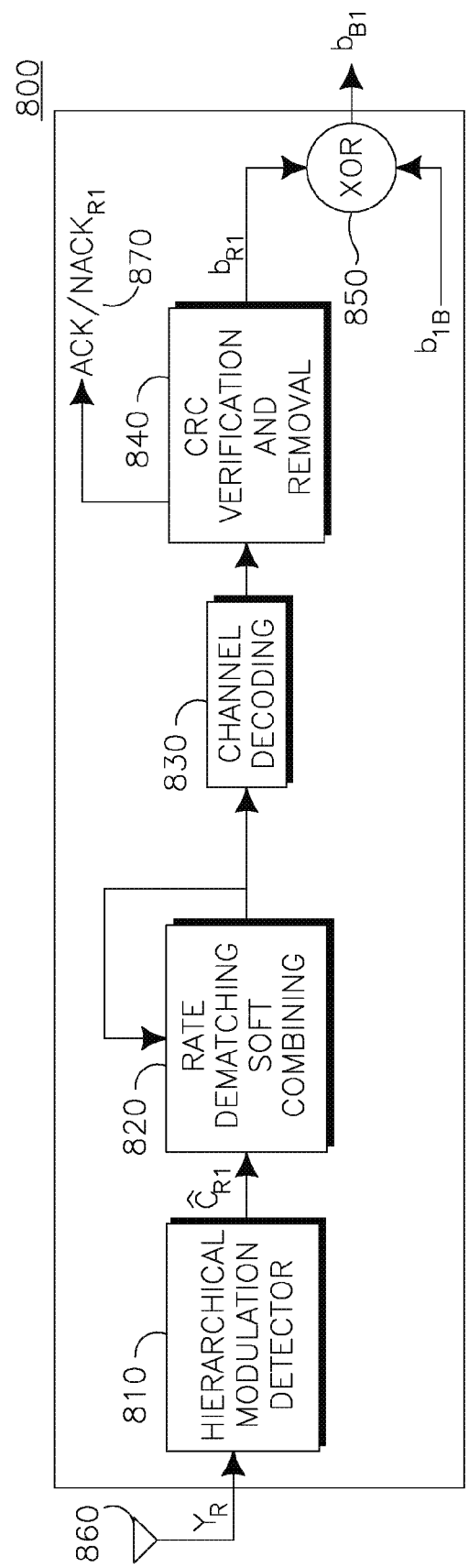
FIG. 8 is a diagram of a general structure of a WTRU receiver.

FIG. 8 is a diagram of a general structure of a WTRU receiver 800. The WTRU receiver 800 may include an HM detector 810, a rate dematching/soft combining unit 820, a channel decoding unit 830, a CRC verification and removal unit 840, an IBS generator 850, and an antenna 860. Upon receiving a signal, the HM detector 810 may estimate corresponding bit sequences, and apply them to a rate dematching/soft combining unit 820 and channel decoding unit 830. The resulting bit sequences may be fed to the CRC verification and removal unit 840. The CRC verification and removal unit 840 may be configured to generate an ACK/NACK 870 that may be transmitted to the BS via an RN. After passing CRC verification, the IBS generator 850 may generate an IBS and process it for transmission.

Bit streams from the hierarchically modulated RN broadcast may be decoded by the WTRUs to which each of the bit streams may be intended. For example, WTRU1 may only need to decode $b_{R1}$, and WTRU2 may only need to decode $b_{R2}$. By performing an XOR operation on one or more previously transmitted bit streams, the WTRU may decode the bits intended for it. If its downlink bit stream was received successfully by the RN, as may be indicated by a NACK from the RN, all zero bits or a pseudo random bit sequence may be used in the XOR operation. The WTRU may not know whether its downlink transmission had been successful if an ACK or a NACK is not received. In this scenario, the WTRU may blindly decode for both cases, and may deem whichever yields a valid CRC to be the desired data packet.

In one example, upon receiving the CSR, the BS and WTRUs may process the received signals. If CSR=[00001], [00010], [00100], [01000], [00011] or [01100], the $k^{th}$ received signals at the BS and WTRUs may be represented as:

$$y_{i,3}^k = h_{R,i} x_R^k + n_{i,3}^k, \quad \text{Equation (1)}$$

where $x_R^k$ is a symbol modulated by M-ary PSK.

In this example, when CSR=[00001], the WTRU$_1$ may process $y_{1,3}$ and generate $b_{B1}$. The BS and WTRU2 may remain idle. When CSR=[00100], WTRU2 may process $y_{2,3}$ and generate $b_{B2}$. The BS and WTRU1 may remain idle. When CSR=[00010] or [01000], the BS may process $y_{B,3}$ and generate $b_{1B}$ or $b_{2B}$. WTRU1 and WTRU2 may remain idle. When CSR=[00011], the BS may process $y_{B,3}$ and generate $b_{1B}$ by XOR($b_{B1}, \hat{b}_{R1}$), WTRU1 may process $y_{1,3}$ and generate $b_{B1}$ by XOR($b_{1B}, \hat{b}_{R2}$), and WTRU2 may remain idle.

If CSR=[x0101], [x0110], [x1001], [x1010], [x0111], [x1011], [x1101], [x1110] or [x1111], the $k^{th}$ received signals at BS and WTRUs may be represented as:

$$y_{i,3}^k = h_{R,i} x_R^k + n_{i,3}^k, \quad \text{Equation (2)}$$

where $x_R^k$ is a symbol modulated by 2M-ary modulation.

The receiver 700 may be configured for full demodulation in a double stream scenario. The receiver 800 may be configured for partial demodulation in a double stream scenario, where the HM detector 810 may be configured to only determine the quadrant of received signals. The WTRU with a larger instantaneous SINR may adopt the receiver structure depicted in FIG. 7. The WTRU with the smaller instantaneous SINR may adopt the receiver structure as depicted in FIG. 8. The BS may adopt the receiver structure depicted in FIG. 7, however the BS may adopt the receiver structure in FIG. 8 when CSR=[00110] and [11001] where only one of the two packets from the WTRUs is successfully received by the RN, and the WTRU has a smaller instantaneous SINR. When CSR=[01100], the BS may process $y_{B,3}$ and generate $b_{2B}$ by XOR($b_{B2}, \hat{b}_{R2}$). WTRU2 may process $y_{2,3}$ and generate $b_{B2}$ by XOR($b_{2B}, \hat{b}_{R2}$), and WTRU1 may remain idle.

If CSR=[x0101], [x0110], [x1001], [x1010], [x0111], [x1011], [x1101], [x1110] or [x1111], the $k^{th}$ received signals at the BS and WTRUs may be represented as:

$$y_{i,3}^k = h_{R,i} x_R^k + n_{i,3}^k, \quad \text{Equation (3)}$$

where $x_R^k$ is a symbol modulated by 2M-ary modulation. For CSR=[x0101], when CSR[4]=0, WTRU1 may determine the quadrant of $y_{1,3}$ and generate $b_{B1}$, and WTRU2 may demodulate $y_{2,3}$ and generate $b_{B2}$. If CSR[4]=1, WTRU2 may determine the quadrant of $y_{2,3}$ and generate $b_{B2}$, WTRU1 may demodulate $y_{1,3}$ and generate $b_{B1}$, and the BS may remain idle.

For CSR=[x0110], when CSR[4]=0, the BS may determine the quadrant of $y_{B,3}$ and generate $b_{1B}$, and WTRU2 may demodulate $y_{2,3}$ and generate $b_{B2}$. If CSR[4]=1, WTRU2 may determine the quadrant of $y_{2,3}$ and generate $b_{B2}$, the BS may demodulate $y_{B,3}$ and generate $b_{1B}$, and WTRU1 may remain idle.

For CSR[4 . . . 0]=[x1001], when CSR[4]=0, WTRU1 may determine the quadrant of $y_{1,3}$ and generate $b_{B1}$, and the BS may demodulate $y_{B,3}$ and generate $b_{2B}$. If CSR[4]=1, the BS may determine the quadrant of $y_{B,3}$ and generate $b_{2B}$, WTRU1 may demodulate $y_{1,3}$ and generate $b_{B1}$, and WTRU2 may remain idle.

For CSR[4 . . . 0]=[x1010], the BS may demodulate $y_{B,3}$ and generate $b_{1B}$ and $b_{2B}$. WTRU1 and WTRU2 may remain idle.

For CSR[4 . . . 0]=[x0111], the WTRU1 may generate $\hat{b}_{R1}$ by determining the quadrant of $y_{1,3}$ if CSR[4]=0, or demodulate $y_{1,3}$ if CSR[4]=1. The WTRU1 may then generate $b_{B1}$ by XOR($b_{1B},\hat{b}_{R,1}$). The BS may generate $\hat{b}_{R,1}$ by determining the quadrant of $y_{B,3}$ if CSR[4]=0, or demodulate $y_{B,3}$ if CSR[4]=1. The BS then may generate $b_{1B}$ by XOR($b_{B1},\hat{b}_{R,1}$). The WTRU2 may generate $b_{B2}$ by demodulating $y_{2,3}$ if CSR[4]=0, or determining the quadrant of $y_{2,3}$ if CSR[4]=1.

For CSR[4 . . . 0]=[x1011], WTRU1 may operate in the same way as in the case CSR=[x0111]. The BS may demodulate $y_{B,3}$ and generate $\hat{b}_{R,1}$ and $b_{2B}$. The BS may generate $b_{1B}$ by XOR($b_{B1},\hat{b}_{R,1}$), and WTRU2 may remain idle.

For CSR[4 . . . 0]=[x1101], the WTRU2 may generate $\hat{b}_{R,2}$ by determining the quadrant of $y_{2,3}$ if CSR[4]=1, or demodulating $y_{2,3}$ if CSR[4]=0. The WTRU2 then may generate $b_{B2}$ by XOR($b_{2B},\hat{b}_{R,2}$). The BS may generate $\hat{b}_{R,2}$ by determining the quadrant of $y_{B,3}$ if CSR[4]=1, or demodulating $y_{B,3}$ if CSR[4]=0. The BS may generate $b_{2B}$ by XOR($b_{B2},\hat{b}_{R,2}$). The WTRU1 may generate $b_{B1}$ by demodulating $y_{1,3}$ if CSR[4]=1, or determining the quadrant of $y_{1,3}$ if CSR[4]=0.

For CSR[4 . . . 0]=[x1110], WTRU2 may operate in the same way as in the case CSR=[x1101]. The BS may demodulate $y_{B,3}$ and generate $\hat{b}_{R,2}$ and $b_{1B}$. The BS may generate $b_{2B}$ by XOR($b_{B2},\hat{b}_{R,2}$), and WTRU1 may remain idle.

For CSR[4 . . . 0]=[x1111], WTRU1 may operate in the same way as in the case CSR=[x0111]. WTRU2 may operate in the same way as in the case CSR=[x1101]. The BS may demodulate $y_{B,3}$ and generate $\hat{b}_{R,1}$ and $\hat{b}_{R,2}$. The BS may generate $b_{1B}$ by XOR($b_{B1},\hat{b}_{R,1}$), and $b_{2B}$ by XOR($b_{B2},\hat{b}_{R,2}$).

User pairing may be performed by either applying Random Pairing or Pairing by Ordering. In Random Pairing, two WTRUs may be randomly selected from N WTRUs to perform the HM scheme. The random pairing may continue until all WTRUs are selected.

In Pairing by Ordering, the user pairing by ordering may be described as follows. The N users may be sorted by their average received SINRs in descending order, for example $\bar{\gamma}_{[1]} > \bar{\gamma}_{[2]} > \ldots > \bar{\gamma}_{[N]}$. Index [i] may be used to denote the sorted version of SINRs. WTRU$_{[i]}$ may denote the WTRU with the $i^{th}$ largest SINR. The WTRUs may then be paired as WTRU$_{[2*i-1]}$ and WTRU$_{[2*i]}$ to perform the HM scheme, where $$i = 1, 2, \ldots, \left[\frac{N}{2}\right].$$

If N is an odd number, WTRU$_{[N]}$ may not be considered in the pairing algorithm. Pairing by ordering may guarantee a good performance while random pairing cannot.

The examples described herein may apply to any number of WTRUs. For N WTRUs, N+1 time slots may be used, instead of 2N time slots for two-way relays. This two-way relaying scheme using XOR network coding may provide improvement in throughput over a 2N time slot relaying scheme despite the fact that HM may require higher SINR for successful decoding.

In an N WTRU example, the RN receiver may have SIC or ML detection capability to enable decoding of distinct data received simultaneously. Each node may be equipped with a single antenna. All communication links may be allocated to a single carrier frequency in TDD fashion (i.e., the channels between node pairs may be reciprocal). The same modulation scheme and coded packet size may be used at the BS and the WTRUs.

The message exchange in the NWTRU example may be performed in two phases, a MAC phase and broadcast (BC) phase. The MAC phase may consists of N time slots. In the $i^{th}$ time slots of the MAC phase, the BS may transmit coded data packets for WTRU$_i$ (i=1, 2, . . . , N) to the RN. The WTRU$_i$ may transmit coded data packets for the BS to the RN simultaneously. The RN may use SIC or ML to recover the messages of the BS and WTRU$_i$. Assuming successful decoding, the RN may perform an XOR operation on both messages, and generate a new data bit sequence, denoted, for example, by the $i^{th}$ intermediate bit sequence, IBS$_i$. N different IBS may be generated by the RN at the end of the N time slots, and the RN may begin the BC phase.

In the BC phase, instead of delivering N IBSs to the BS and N WTRUs in N time slots, as with conventional network coding schemes, the RN may transmit the N IBSs in one time slot using a modulation scheme with an N-times larger constellation size. For example, the RN may use HM and opportunistically exploit the differing channel qualities for each destination node by ordering the layers of the HM. Two benefits may be achieved by using HM in this way. HM may not only enable carrying multiple IBSs simultaneously, it may also protect data destined for the WTRUs with poorer channel conditions by mapping their data to lower data rates. Some channel quality information may be known at the RN to enable the implementation of HM in this way. Various parameters may be used to support this, such as the channel quality indicator (CQI) or WTRU instantaneous SNR, for example.

Accordingly, the N IBSs generated at the end of the MAC phase, may be grouped together to create a new intermediate bit sequence (IBS$_R$) at the RN for the purpose of HM transmission in the BC phase. One way to generate IBS$_R$ is described as follows.

The RN may order the SNRs of NRN-to-WTRU channels in an ascending order, such that SNR$_{[1]}$<SNR$_{[2]}$< . . . <SNR$_{[N]}$. IBS$_{[i]}$ may denote a bit sequence associated to the RN-to-WTRU channel with SNR$_{[i]}$. The bits of each sequence IBS$_{[i]}$ may be rearranged at the RN into Q symbols, where Q is the sequence length of each of the IBSs. Each symbol may consist of N bits drawn from the N IBS sequences, such that the $k^{th}$ bit of each sequence may be in the $k^{th}$ symbol. Moreover, the bits of each symbol may be ordered the same as their corresponding SNR. FIG. 6 is a diagram of how the mapping and rearrangement may be performed at the RN. IBS$_R$ may be the collection of these Q symbols. The RN may apply HM to each symbol of IBS$_R$, forming one packet that may be transmitted in time slot N+1.

Upon reception from the RN, the BS may demodulate and decode the received signal and, assuming successful decoding, it may dismantle IBS$_R$ to recover all of the N original IBSs. The BS may then perform an XOR operation on the $i^{th}$ IBS, with its own data transmitted in the same time slot, to retrieve the message intended for WTRU$_i$. The WTRUs, on the other hand, may demodulate and decode the received signal partially or fully depending on the order of their IBSs. Assuming successful decoding, WTRU$_i$ may only perform an XOR operation on the $i^{th}$ IBS, with its own data, to retrieve the BS message for WTRU$_i$. Although the WTRUs may obtain IBSs of other users, user data privacy may be preserved. The IBS may be a mixture of BS and WTRU data obtained by performing an XOR operation, and only those in possession of the BS or WTRU original messages may be able to undo the XOR operation.

The general two-way relaying schemes described above may implement a HARQ process. HARQ is a form of implicit link adaptation and may improve the overall throughput in wireless communications. The HARQ design for the two-way relaying scheme may use physical-layer network coding.

The example embodiments described herein may enable each BS or WTRU to know whether the data it transmits has reached the end destination. Since each data packet may go over two hops through the RN, an ACK on each link may not necessarily imply that the data has reached the destination. The example embodiments may employ a retransmission strategy so that the efficiency of the relaying scheme is not severely or unnecessarily impaired when a single transmission fails. These embodiments may also apply HARQ and other link adaptation techniques to the relaying scheme. Since the RN broadcasts XOR'ed data, a determination may be performed on how to decode the broadcast if any downlink data packet is received in error.

The proposed design may involve elements in a wireless communication device and system that may be considered to be the PHY and MAC layers. The RN may be in control of the relaying operation, responsible for scheduling the BS and WTRUs for their time slots for transmission and reception. Each physical link may be treated as an independent wireless link employing HARQ. However, the ACKs and NACKs across the two hops may be combined into a destination ACK/NACK so that source and destination, for example the RLC, are informed of the overall relay link success or failure. Unsuccessful DL transmissions (towards the RN) may not be retransmitted until the next relaying cycle, such that they do not interrupt the relaying cycle. Any unsuccessful UL transmission (broadcast by the RN), however, may trigger the RN to retransmit the broadcast, thereby extending the relaying cycle. The modulation for the retransmission may change depending on the NACK(s) received.

The example two-way relaying schemes described herein may use a stop-and-wait HARQ process. Acknowledgements over individual links, either synchronous or asynchronous, may be transmitted over a control channel which is orthogonal with, or independent of, the data channel. Acknowledgements may not be perfectly reliable. A beacon may be transmitted by the RN to indicate the start of the relay cycle and to inform each party of their time slots to transmit and receive. Alternatively, a beacon may be transmitted periodically at every slot. A special beacon may contain an indicator, and may be transmitted at the beginning of the first slot to indicate the beginning of each relaying cycle.

The HARQ of the two-way relay scheme using network coding may be characterized by the following examples. In a first example, when any DL transmission fails, the RN may send a NACK to the sender, which could be either a BS or WTRU. The RN may use zero to represent failed-to-receive bits in network coding (XOR). XOR with all zeroes may keep the bits unchanged. Alternatively, a pseudo random bit stream, previously agreed upon between the transmitter and receiver, may be used to preserve data privacy. Upon receiving a NACK, the transmitting node of the link, for example the BS or the WTRU, may assume all-zero bits or a previously agreed upon pseudo random bit stream. The transmitting node of the link may decode the network coding in the RN broadcast with all zeroes or the pseudo random bits. If neither an ACK nor a NACK is received, the transmitting node of the link, without knowing whether its downlink has been correctly received by the RN, may blindly decode the RN broadcast by XORing with either its downlink data, a zero, or pseudo random bits. Whichever option results in a valid CRC may be used to decode the desired data.

In a second example, when both links of the same downlink time slot fail, the RN may decide not to use hierarchical modulation at all in the broadcast phase. In this example, the RN may inform these two nodes of the modulation used for the broadcast.

In a third example, an RN may not wait for a DL failure. Unsuccessfully transmitted data may be retransmitted in the next relaying cycle. In the case of multiple pipelined HARQ processes, the retransmission may be scheduled for the next available opportunity.

In a fourth example, when any UL transmission fails, i.e., any NACK is received for the broadcast phase, the RN may retransmit the broadcast, thereby extending the relaying cycle. The relaying cycle may be extended until all ACKs are received or until the retransmission times out. The retransmission, however, may not necessarily transmit the same $X_R$ signal. Instead, hierarchical modulation may be modified to transmit $X'_R$, that may contain only the necessary bit streams, as discussed below.

In the cases where a single packet, or the paired packets ($b_{1B}$ and $b_{B1}$ or $b_{2B}$ and $b_{B2}$), was received in error, only the intermediate bits $b_{R1}$ or $b_{R2}$ may be retransmitted. In these cases, the chance for successful retransmission may be improved due to the absence of hierarchical transmission. Hierarchical modulation in the retransmission may be applied when the unpaired bit streams are received in error. Table 2 lists example combinations of transmission errors and the necessary data for retransmission, where ✓ indicates that the bits were received successfully, X indicates that the bits were received in error, and $b_{R1}=XOR(b_{1B}, b_{B1})$, $b_{R2}=XOR(b_{2B}, b_{B2})$.

TABLE 2

Transmission Errors.

| $b_{1B}$ | $b_{B1}$ | $b_{2B}$ | $b_{B2}$ | Retransmission: $X'_R$ |
|---|---|---|---|---|
| ✓ | ✓ | ✓ | X | $b_{R2}$ |
| ✓ | ✓ | X | ✓ | $b_{R2}$ |
| ✓ | ✓ | X | X | $b_{R2}$ |
| ✓ | X | ✓ | ✓ | $b_{R1}$ |
| X | ✓ | ✓ | ✓ | $b_{R1}$ |
| X | X | ✓ | ✓ | $b_{R1}$ |
| ✓ | X | ✓ | X | $HM(b_{R1}, b_{R2})$ |
| ✓ | X | X | ✓ | $HM(b_{R1}, b_{R2})$ |
| ✓ | X | X | X | $HM(b_{R1}, b_{R2})$ |
| X | ✓ | ✓ | X | $HM(b_{R1}, b_{R2})$ |
| X | ✓ | X | ✓ | $HM(b_{R1}, b_{R2})$ |
| X | ✓ | X | X | $HM(b_{R1}, b_{R2})$ |
| X | X | ✓ | X | $HM(b_{R1}, b_{R2})$ |
| X | X | X | ✓ | $HM(b_{R1}, b_{R2})$ |
| X | X | X | X | $HM(b_{R1}, b_{R2})$ |

Note that the intermediate bits $b_{R1}$, $b_{R2}$, or their hierarchical modulation, may be retransmitted. The original bit streams $b_{1B}$, $b_{B1}$, $b_{2B}$ or $b_{B2}$, may not be retransmitted. In addition, the $2^{nd}$ and subsequent retransmissions may transmit the same intermediate bits or hierarchical modulation as the $1^{st}$ retransmission. This may be performed to preserve data privacy at the link level without sacrificing performance. For example, the number of bits to be transmitted may be the same, and only the intended recipients may decode them. In addition, transmitting the same intermediate bits or hierarchical modulation as the Pt transmission may allow for soft combining of retransmissions. The format of retransmissions may be communicated to the intended recipient through control channels.

In a fifth example, soft combining and redundancy versions (RVs) may be used. In this example, when a transmission fails, any retransmission may be combined with one or more previous transmissions to improve the chance for decoding success. There are two basic combining methods, including Chase combining and incremental redundancy, representing two extreme cases. The actual combining design may be somewhere between these two extremes. The state machines or the signal flow may not be affected by the choice of combining. In Chase combining, for example, all the encoded bits may be transmitted at each retransmission. In incremental redundancy, for example, as a form of implicit link adaptation, different encoded bits may be transmitted at each retransmission.

For example, the systematic bits (S) may be transmitted the first time, the first parity bits (P1) the $2^{nd}$ time, and the second parity bits (P2) the $3^{rd}$ time, etc. Each set of bits transmitted may be designated a redundancy version (RV). Upon transmission failure, the receiver may request a specific set of bits to be retransmitted based on measurements, such as SINR. This approach may require more acknowledgement overhead.

In a sixth example, modulation order may be used as a form of explicit link adaptation. It may be possible to change the coding rate and therefore modulation order for one or more retransmissions. Changing the modulation order may require all parties involved to be informed. For the downlink, only the RN may need to know of the change. For the uplink, all receivers may need to be informed of the change.

For an RN retransmission, hierarchical demodulation at the BS or WTRU may not be needed if the RN does not need to use hierarchical modulation. The receiver may use one indicator bit through the control channel whether a different modulation is expected. For example, the BS and the WTRU may use 4QAM, and the RN may use 16QAM with HM. The RN may use 4QAM without HM for a retransmission, or it may use another modulation that is different than 16QAM with HM. The change in modulation may be indicated by the RN. The BS and WTRUs may maintain their soft bit buffers if the CRC is not valid.

In the HARQ design for relays using network coding, there may be a beacon transmitted by the RN to indicate the start of the relaying cycle. In addition, the beacon may also contain instructions to the BS and WTRUs about their assignment of times slots for transmission and reception. Alternatively, a beacon may be transmitted to indicate the beginning of every time slot, and that a special beacon, containing an indicator, may be transmitted at the beginning of the first time slot in each relaying cycle to serve the above-mentioned purposes.

Per-link acknowledgements may be transmitted over control channels that are orthogonal to the data traffic channels. Acknowledgements may be perfectly reliable. For example, they may always be received successfully with no missing ACKs or NACKs. In other words, a transmitter may always know whether its data has been successfully decoded by the receiver. Knowing whether the data has been successfully decoded by the receiver may be necessary in order for the network-coded transmissions to be decoded correctly.

A mechanism for implementing a destination-ACK and a destination-NACK may be used for transmission over relays. The destination-ACK and destination-NACK may be used to confirmation whether a data packet has successfully arrived at the receiving end of the second hop. This information may be provided to the upper layers, for example, the radio link controller (RLC) layer of the transmitting node. For each packet transmitted by any node in the relaying scheme, the transmitting node may receive an acknowledgement from the RN to indicate whether the first hop packet has arrived at the RN. The transmitting node, however, may only know whether the packet has arrived at the receiving end of the second hop after receiving a destination-ACK or destination-NACK. A destination-ACK may be transmitted by the RN after its broadcast transmission has been acknowledged by the destination. Similarly, a destination-NACK may be transmitted by the RN after its broadcast transmission has failed to reach the destination at least once and has timed out.

In this HARQ scheme, DL transmission failures from the BS to the RN and from the WTRU to the RN may not interrupt the relay cycle. When a DL error occurs, as indicated by a NACK from the RN, a retransmission may be performed in the next relay cycle. On the RN side, when any DL transmission is not decoded correctly, the RN may assume all zero bits are received and use all zeroes in the network coding by performing an XOR operation with all zeroes and keeping the bit stream unchanged. The corresponding DL transmitter may decode the RN broadcast based on that assumption. In the RN, the received soft bits may be preserved for combining with one or more subsequent retransmissions.

Alternatively, instead of using all zero bits, the two parties may use a previously agreed pseudo random bit sequence. If only the two parties involved area aware of what this random sequence is, data privacy may be preserved in the case of DL transmission failure.

Any UL transmission failure may trigger a retransmission by the RN in the immediate next time slot, thereby extending the relaying cycle by one time slot for each retransmission. The retransmission may or may not transmit the hierarchically modulated bit stream based on one or more UL transmission failures. As long as the intermediate bit stream remains the same for retransmissions, it may be possible to perform soft combining. For both DL and UL, a retransmission may time out if the number of transmissions has exceeded some predefined constant, and the DL and UL may have different time-outs.

In performing soft combining, the transmitter may have several choices in selecting the encoded bits to transmit. The soft combining may be performed through puncturing. The transmitter may also change the modulation and coding scheme (MCS) for each particular transmission or retransmission. The RV used in the HARQ process may include both puncturing and MCS.

Soft combining may be used in HARQ. In conventional ARQ, when a block error occurs, the decoded bits may be discarded, and the information may be retransmitted until all the bits are received and decoded correctly. In HARQ, however, the errored bits may not be discarded, but rather their soft bits may be combined with those from one or more subsequent retransmissions, thereby improving the chances of correct decoding. There are two basic forms of soft combining: Chase combining and incremental redundancy. The actual combining method used in relay scenarios may be some combination of both forms.

Soft combining may be part of rate dematching, where the received soft bits may be matched with what the channel decoder expects. When a bit that the channel decoder expects is not transmitted, for example, when the bit is punctured out, the rate dematcher may fill the void with a neutral soft value. When the channel decoder receives a bit more than once, or when this particular bit was punctured out in one or more previous transmissions, some form of combining may be needed.

The following example illustrates a mechanism for soft combining using the WTRU1 transmitter from FIG. 3 and the RN receiver from FIG. 4. In the transmitter, data may be encoded through FEC. The channel encoded packet $e_{1B}$ may be partitioned into systematic bits (S) and one or more groups of parity bits (P1 and P2), for example:

$$e_{1B}=\{S,P1,P2\}. \qquad \text{Equation (4)}$$

The packet $e_{1B}$ may be denoted as a sequence of N bits:

$$e_{1B}=\{e_{1B}(1),e_{1B}(2),e_{1B}(3),\ldots,e_{1B}(N)\}. \qquad \text{Equation (5)}$$

In the $i^{th}$ transmission, the transmitter may choose to transmit $c_{1B}{}^i$, which may be a subset of $e_{1B}$. The choice of the subset may be based on Chase combining incremental redundancy considerations.

Regardless which subset is transmitted, the received signal in the receiver from the $i^{th}$ transmission may be denoted as $Y_{B1}{}^i$ and the soft bit packet $\hat{c}_{1B}{}^i$ as a sequence of N individual soft bits:

$$\hat{c}_{1B}{}^i=\{\hat{c}_{1B}{}^i(1),\hat{c}_{1B}{}^i(2),\hat{c}_{1B}{}^i(3),\ldots,\hat{c}_{1B}{}^i(N)\}, \qquad \text{Equation (6)}$$

and each soft bit may be the log likelihood ratio (LLR) out of the detector:

$$\hat{c}_{1B}^i(k) = LLR^i(k) = \ln\frac{p(e_{1B}(k)=1\,|\,Y_{B1}^i)}{p(e_{1B}(k)=0\,|\,Y_{B1}^i)}, \qquad \text{Equation (7)}$$

for $k = 1, 2, 3, \ldots, N$.

The LLR value for a neutral bit may be 0, such that there is an equal likelihood the bit transmitted was 0 or 1.

In one example of Chase combining, the redundancy version $RV_{1B}$ may be selected such that the $i^{th}$ transmission $c_{1B}{}^i$ for all i's is:

$$c_{1B}{}^i=e_{1B}=\{S,P1,P2\}, i=1,2,3,\ldots \qquad \text{Equation (8)}$$

such that, all encoded bits may be transmitted at each retransmission. In the receiver, the soft bits directed to the channel decoder after the first transmission may be represented as:

$$\hat{e}_{1B}{}^1=\hat{c}_{1B}{}^1=\{LLR^1(1),LLR^1(2),LLR^1(3),\ldots,LLR^1(N)\}. \qquad \text{Equation (9)}$$

If decoding of the first transmission is not successful, for example, if the CRC is invalid), the same bits may be transmitted a second time, and the combined soft bits may be represented as:

$$\hat{e}_{1B}{}^2=\hat{c}_{1B}{}^1+\hat{c}_{1B}{}^2=\{LLR^1(1)+LLR^2(1),LLR^1(2)+LLR^2(2),LLR^1(3)+LLR^2(3),\ldots,LLR^1(N)+LLR^2(N)\} \qquad \text{Equation (10)}$$

The combined soft bits after M transmissions may be represented as:

$$\hat{e}_{1B}^M = \sum_{m=1}^M \hat{c}_{1B}^m = \left\{\sum_{m=1}^M LLR^m(k)\bigg|_{k=1,2,\ldots,N}\right\}. \qquad \text{Equation (11)}$$

Figure 9:
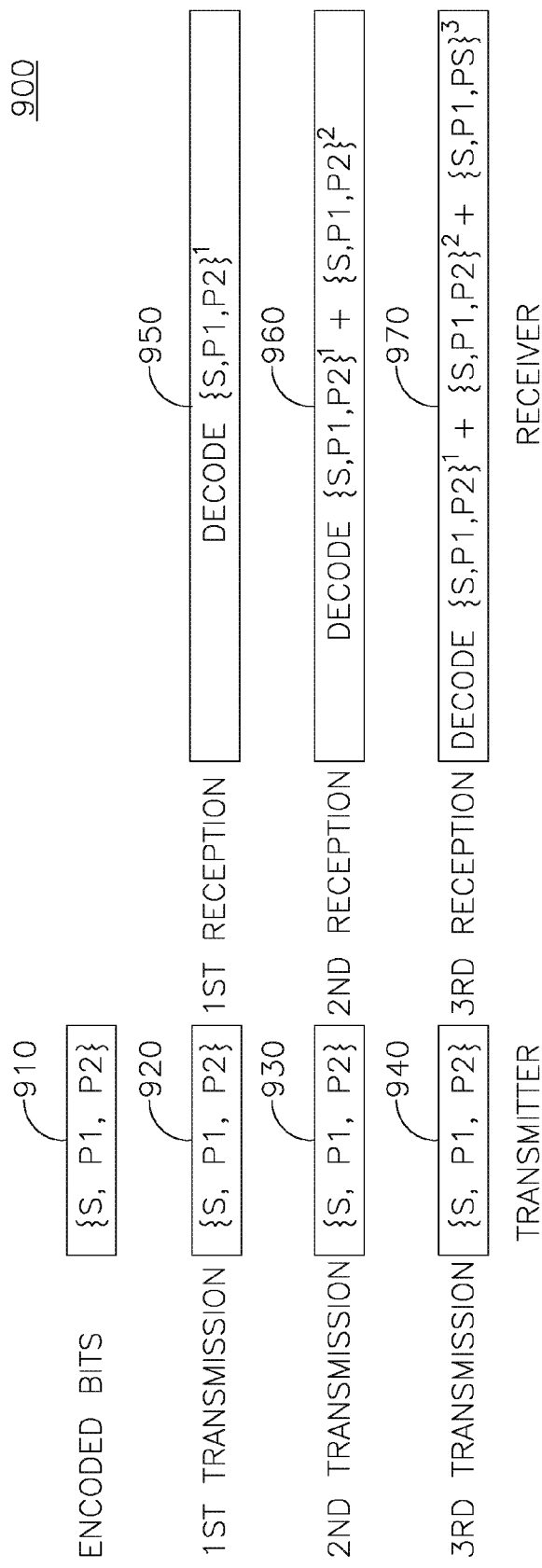
FIG. 9 is a diagram of an example mechanism for Chase combining.

FIG. 9 is a diagram of an example mechanism 900 for Chase combining. In this example, the encoded bits 910 may be partitioned into S bits, P1 bits, and P2 bits. All the encoded bits 910 may be transmitted in a first transmission 920, a second transmission 930, and a third transmission 940. The receiver may be configured to receive the soft bits, sum the soft bits, and channel-decode the soft bits. For example, in the first reception 950, the receiver may decode $\{S, P1, P2\}^1$. In the second reception 960, the receiver may decode $\{S, P1, P2\}^1+\{S, P1, P2\}^2$. In the third reception 970, the receiver may decode $\{S, P1, P2\}^1+\{S, P1, P2\}^2+\{S, P1, P2\}^3$. With each retransmission, the soft bits may become increasingly reliable, and the chance for successful decoding may be improved. Chase combining may also be used in retransmission.

Figure 10:
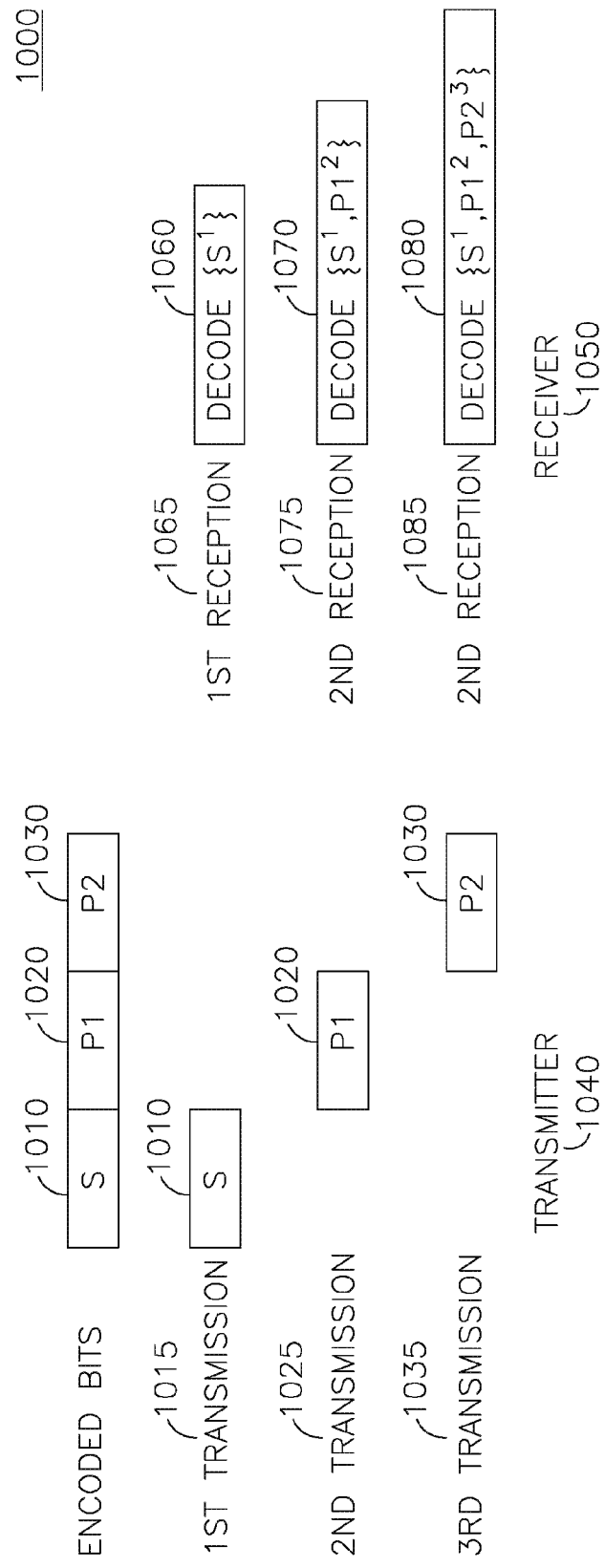
FIG. 10 is a diagram of an example incremental redundancy mechanism.

FIG. 10 is a diagram of an example incremental redundancy mechanism 1000. In this example, the encoded bits may be partitioned into S bits 1010, P1 bits 1020, and P2 bits 1030. The transmitter 1040 may transmit the S bits 1010 in a first transmission 1015, the P1 bits 1020 in a second transmission 1025, and the P2 bits 1030 in a third transmission 1035. The receiver 1050 may receive and decode $\{S^1\}$ 1060 in the first reception 1065, $\{S^1, P1^2\}$ 1070 in the second reception 1075, and $\{S^1, P1^2, P2^3\}$ 1080 in the third reception 1085.

In another example of incremental redundancy, the redundancy versions $RV_{1B}$'s may be selected such that the $i^{th}$ transmissions $c_{1B}{}^i$ are:

$$c_{1B}{}^1=\{S\}$$

$$c_{1B}{}^2=\{P1\},$$

$$c_{1B}{}^3=\{P2\}. \qquad \text{Equation (12)}$$

In the receiver, the soft bits from the first transmission may be represented as:

$$\hat{c}_{1B}{}^1=\{LLR^1(1),LLR^1(2),LLR^1(3),\ldots,LLR^1(N_S)\}, \qquad \text{Equation (13)}$$

where $N_S$ is the number of systematic bits $\{S\}$.

After rate dematching, the soft bits directed to the channel decoder may be represented as:

$$\hat{e}_{1B}{}^1=\{\hat{c}_{1B}{}^1,0,0,\ldots,0\}, \qquad \text{Equation (14)}$$

which may contain $N_S$ soft bits from $\hat{c}_{1B}{}^1$ and $N_{P1}+N_{P2}$ zeroes, where $N_{P1}$ is the number of encoded bits in $\{P1\}$, and $N_{P2}$ the number of encoded bits in $\{P2\}$.

If decoding after the first transmission is not successful, a second transmission may be requested. The transmitted bits may be represented as $c_{1B}{}^2=\{P1\}$. In the receiver, the soft bits from the second transmission may be represented as:

$$\hat{c}_{1B}{}^2=\{LLR^2(N_S+1),LLR^2(N_S+2),LLR^2(N_S+3),\ldots,LLR^2(N_S+N_{P1})\}. \qquad \text{Equation (15)}$$

After rate dematching and combining with the first transmission, the soft bits directed to the channel decoder may be represented as:

$$\hat{e}_{1B}{}^2=\{\hat{c}_{1B}{}^1,\hat{c}_{1B}{}^2,0,0,\ldots,0\}, \qquad \text{Equation (16)}$$

which may contain $N_S$ soft bits from $\hat{c}_{1B}{}^1$, $N_{P1}$ soft bits from $\hat{c}_{1B}{}^2$, and $N_{P2}$ zeroes.

If decoding after the $2^{nd}$ transmission is still not successful, a $3^{rd}$ transmission may be requested. The transmitted bits may be represented as $c_{1B}{}^3=\{P2\}$. In the receiver, the soft bits from the $3^{rd}$ transmission may be represented as:

$$\hat{c}_{1B}{}^3\{LLR^3(N_S+N_{P1}+1),LLR^3(N_S+N_{P1}+2),LLR^3(N_S+N_{P1}+3),\ldots,LLR^3(N_S+N_{P1}+N_{P2})\}. \qquad \text{Equation (17)}$$

After rate dematching and combining with the first and second transmissions, the soft bits directed to the channel decoder may be referred to as:

$$\hat{e}_{1B}{}^2=\{\hat{c}_{1B}{}^1,\hat{c}_{1B}{}^2,\hat{c}_{1B}{}^2\}, \qquad \text{Equation (18)}$$

which may contain $N_S$ soft bits from $\hat{c}_{1B}{}^1$, $N_{P1}$ from $\hat{c}_{1B}{}^2$, and $N_{P2}$ from $\hat{c}_{1B}{}^3$.

In this example, the transmitter may only transmit a portion of the FEC-encoded bits in each time slot. If the receiver is able to successfully decode the FEC-encoded encoded bits, additional transmissions may not be needed. If the receiver fails to decode the data correctly the first time, additional encoded bits may be transmitted to provide the receiver additional information for decoding. For turbo coding, incremental redundancy, as a form of implicit channel adaptation, may achieve higher spectral efficiency than Chase combining.

The RVs may not be partitioned exactly along the lines of systematic and parity bits. Including some parity bits in the systematic RV and having some systematic bits in the parity RVs may improve performance. In addition, the number of transmissions may exceed 3, in which case there may be more than 3 RVs, or certain RVs may be reused in retransmissions. The number of coded bits in each transmission may not be the same as in the previous transmissions. This may not be an issue with network coding, as only the hard bits, those decoded from the coded bits, may be involved in the XOR operation.

A HARQ may use a retransmission strategy that is somewhere between Chase combining and incremental redundancy. Since a retransmission may be based on the ACK/NACK received by the transmitter, the particular soft combining method may be selected regardless of how the acknowledgement scheme is designed. For example, the soft combining method may be selected regardless of the acknowledgement scheme as long as the soft bits may be combined and the transmitters and receivers involved are following the same protocol.

State machines are actions that may be performed on each node based on the input each node receives. Each node may act independently and have no direct control or knowledge on the state of, or actions by, other nodes, other than the input it may receive and an assumption that other nodes are following the protocol. HARQ actions may be performed in the PHY and MAC layers.

Figure 11:
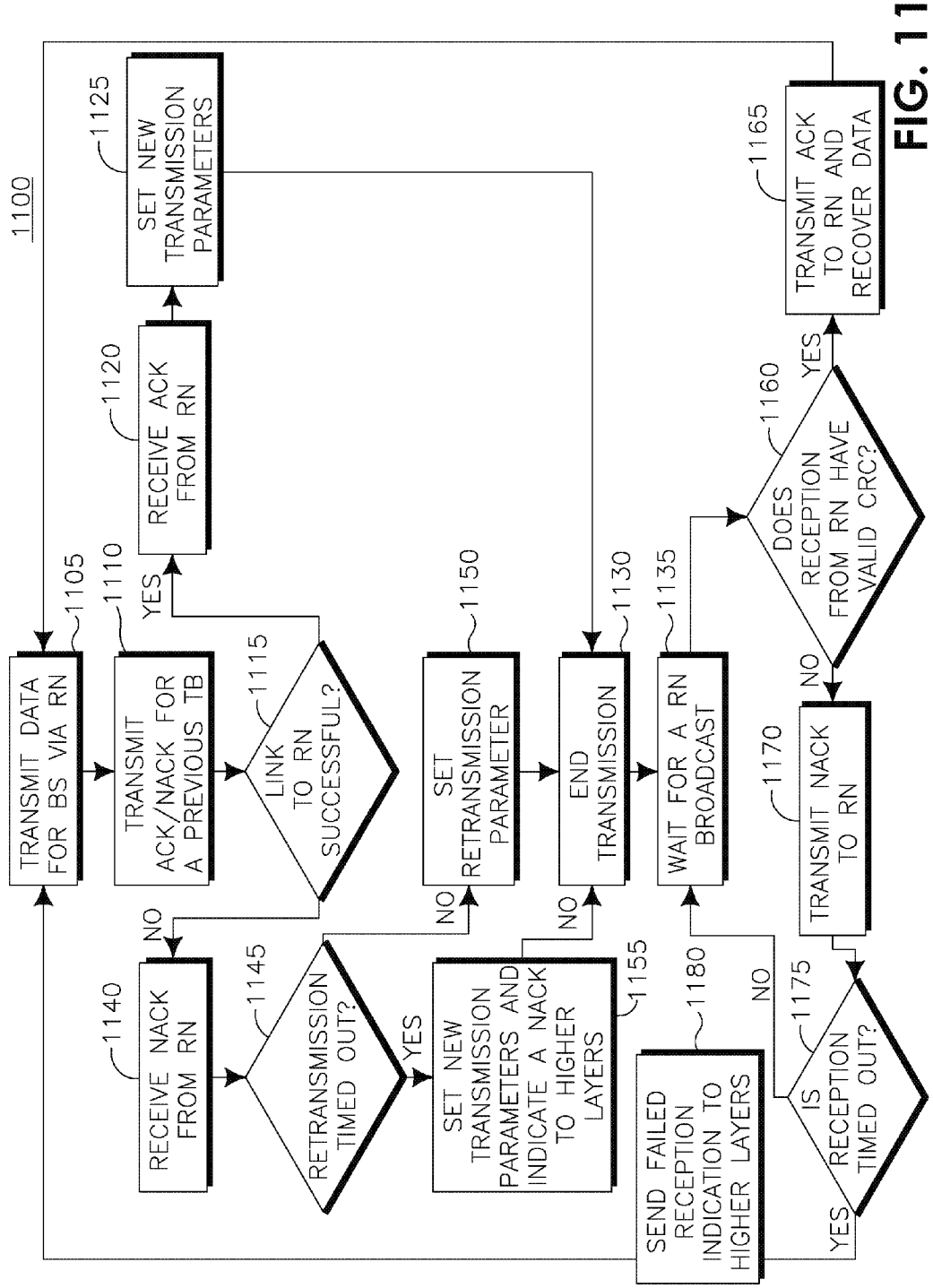
FIG. 11 is a flow diagram of an example hybrid automatic repeat request (HARQ) state machine for a WTRU.
Figure 13:
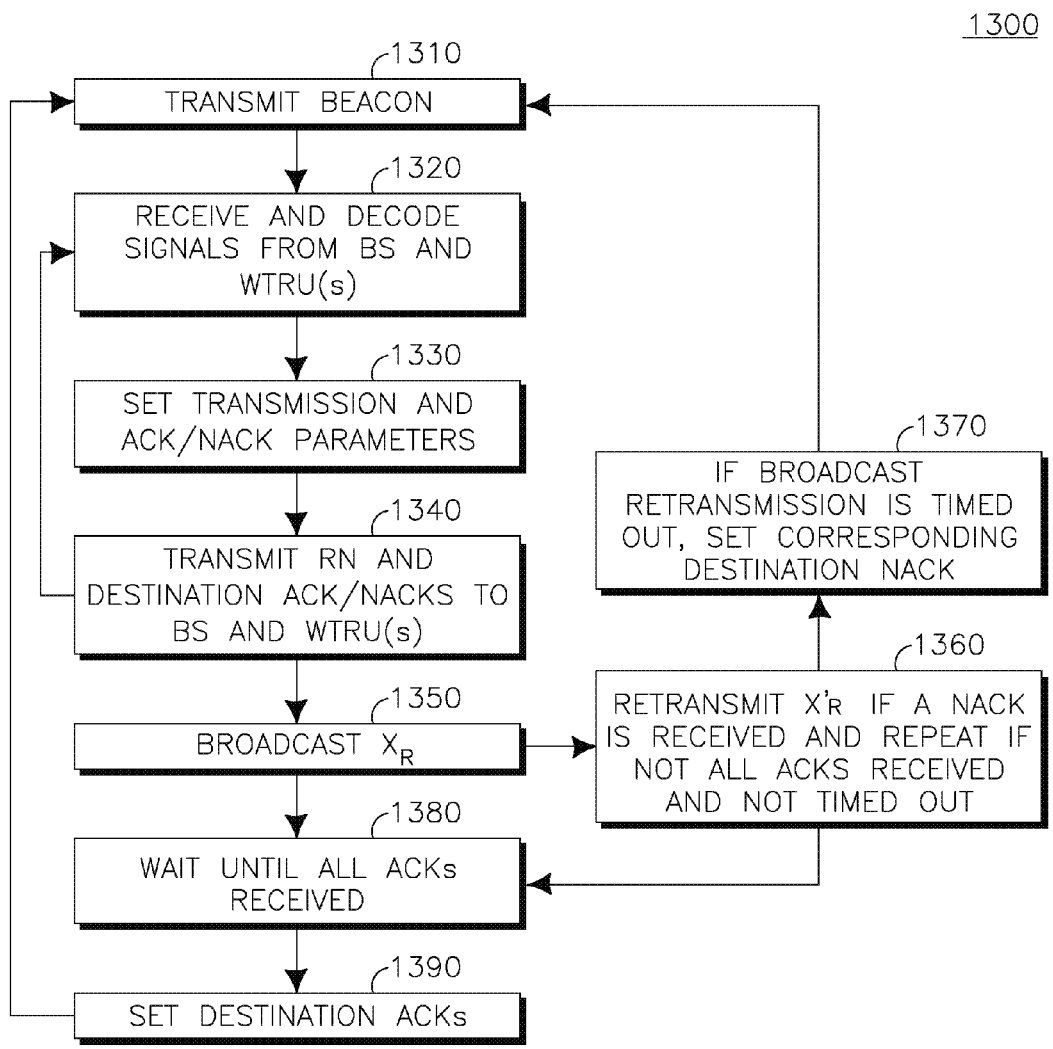
FIG. 13 is a flow diagram of an example HARQ state machine for an RN.

The state machines for the BS and WTRUs are similar, but not identical, since the BS may transmit in every downlink time slot while each WTRU may transmit in only one, or not all, of the downlink slots. Example state machines for WTRU1 and the BS are illustrated in FIGS. 11 and 13, respectively. The state machines for other WTRUs may be analogous to that of WTRU1.

Figure 12:
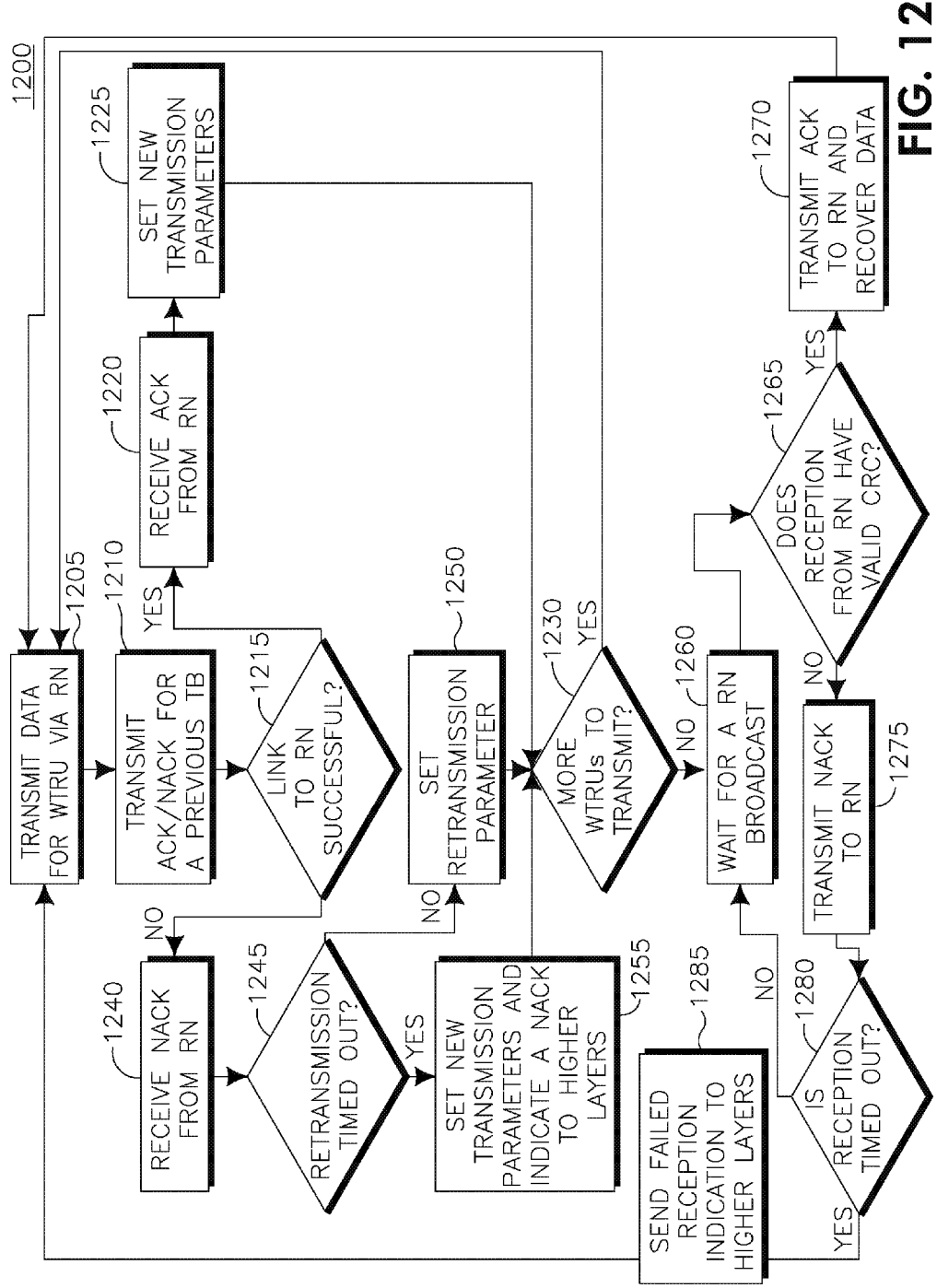
FIG. 12 is a flow diagram of an example HARQ state machine for a BS.

The example state machines in FIGS. 11 through 13 have been simplified for the downlink NACK scenario for clarity. For WTRU1, if neither an ACK nor a NACK is received from the RN, WTRU1 may blindly decode $b_{B1}$ by setting $u_{1B}(i)$ to: $b_{1B}(i)$, zero, or a pseudo random bit sequence for preserving data privacy. WTRU1 may base its decoding strategy on whichever case yields a valid CRC that results in the desired $b_{B1}$. The BS may employ the same blind process in XOR decoding.

FIG. 11 is a flow diagram of an example HARQ state machine 1100 for a WTRU. In this example, a WTRU may transmit 1105 data for a BS via an RN. The WTRU may also transmit 1110 and ACK/NACK for a previous transmission block (TB). If a link to the RN is successfully established 1115, the WTRU may receive 1120 an ACK from the RN and set 1125 a new transmission parameter. The new transmission parameter may be set based on a channel condition of each of the involved links and may involve new data. When the new transmission parameter is set 1125, the WTRU may end transmission 1130 and wait 1135 for an RN broadcast.

If the link to the RN is not successful 1115, the WTRU may receive 1140 a NACK from the RN. If a retransmission has not timed out 1145, the WTRU may set 1150 a retransmission parameter, end transmission 1130, and wait 1135 for an RN broadcast. If a retransmission has timed out 1145, the WTRU may set 1155 new transmission parameters and indicate a NACK to higher layers, end transmission 1130, and wait 1135 for an RN broadcast.

When the WTRU receives an RN broadcast, the WTRU may determine 1160 whether the RN broadcast includes a valid CRC. If the RN broadcast includes a valid CRC, the WTRU may transmit 1165 an ACK to the relay and recover its intended data. If the RN broadcast does not include a valid CRC, the WTRU may transmit 1170 a NACK to the RN. If the reception has not timed out 1175, the WTRU may wait 1135 for an RN broadcast. If the reception has timed out 1175, the WTRU may send 1180 a failed reception indication to higher layers and return to transmitting data 1105.

FIG. 12 is a flow diagram of an example HARQ state machine 1200 for a BS. The BS may transmit 1205 data for a WTRU via an RN. The BS may transmit 1210 an ACK/NACK for a previous TB. If a link to the RN is successfully established 1215, the BS may receive 1220 an ACK from the RN and set 1225 a new transmission parameter. The new transmission parameter may be set based on a channel condition and may include new data. When the new transmission parameter is set 1225, the BS may determine 1230 whether there are additional WTRUs awaiting transmission. If there are additional WTRUs awaiting transmission, the BS may resume transmitting data 1205. If there are no WTRUs awaiting transmission, the BS may wait 1260 for an RN broadcast.

If the link to the RN is not successful 1215, the BS may receive 1240 a NACK from the RN. If a retransmission has not timed out 1245, the BS may set 1250 a retransmission parameter, and determine 1230 whether there are additional WTRUs awaiting transmission. If a retransmission has timed out 1245, the BS may set 1255 new transmission parameters and indicate a NACK to higher layers, and determine 1230 whether there are additional WTRUs awaiting transmission. The new transmission parameters may include the same data, or it may include different data. If there are additional WTRUs awaiting transmission, the BS may resume transmitting data 1205. If there are no WTRUs awaiting transmission, the BS may wait 1260 for an RN broadcast.

When the BS receives an RN broadcast, the WTRU may determine 1265 whether the RN broadcast includes a valid CRC. If the RN broadcast includes a valid CRC, the BS may transmit 1270 an ACK to the relay and recovers its data. If the RN broadcast does not include a valid CRC, the BS may transmit 1275 a NACK to the RN. If the reception has not timed out 1280, the BS may wait 1260 for an RN broadcast. If the reception has timed out 1280, the BS may send 1285 a failed reception indication to higher layers and return to transmitting data 1205.

FIG. 13 is a flow diagram of an example HARQ state machine 1300 for an RN. In this example, the RN may transmit 1310 a beacon and receive and decode 1320 signals from a BS and one or more WTRUs. The RN may then set 1330 transmission and ACK/NACK parameters, and transmit 1340 RN and destination ACK/NACKs to the BS and one or more WTRUs. The RN may wait to receive all the signals from the BS and one or more WTRUs before broadcasting 1350 $X_R$ data.

If a NACK is received 1360, the RN may retransmit the data $X'_R$ and repeat if not all ACKs are received and the broadcast retransmission is not timed out. If the broadcast retransmission is timed out 1370, the RN may set the corresponding destination NACKs and resume transmitting 1310 the beacon. When all the ACKs are received 1380, the RN may set 1390 the destination ACKs and resume transmitting 1310 the beacon.

Figure 14:
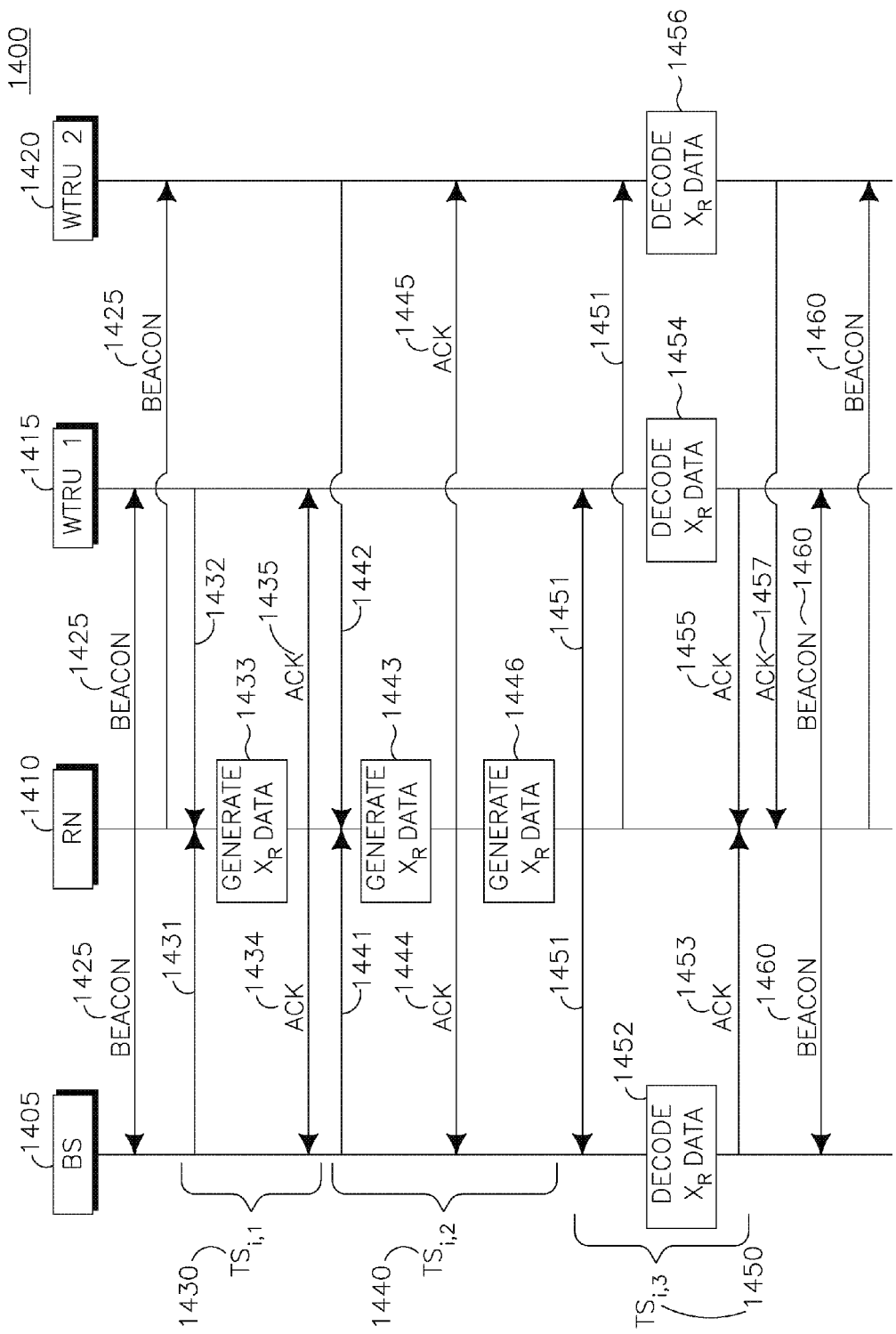
FIG. 14 is a signal diagram of an example two-way relay transmission where all downlink and uplink transmissions are successful.

FIG. 14 is a signal diagram 1400 of an example two-way relay transmission where all downlink and uplink transmissions are successful. This example relay scheme may involve a BS 1405, an RN 1410, a first WTRU (WTRU1) 1415, and a second WTRU (WTRU2) 1420, where the RN 1410 may transmit a beacon 1425.

In a first time slot 1430, the RN 1410 may receive a signal 1431 from the BS 1405 and a signal 1432 from WTRU1 1415. The RN 1410 may receive these signals simultaneously. The RN 1410 may then generate $X_R$ data 1433 and transmit an ACK 1434 to the BS 1405 and an ACK 1435 to WTRU1 1415. The $X_R$ data 1433 may be generated such that $g_{R,3l+1}{}^q=\text{XOR}(C_{B1}{}^q, C_{1B}{}^q)$, where q=1, 2, ... Q. The RN may adopt a transmitter structure, as shown in FIG. 5, to generate the $X_R$ data 1433.

In a second time slot 1440, the RN 1410 may receive a signal 1441 from the BS 1405 and a signal 1442 from WTRU2 1420. The RN 1410 may receive these signals simultaneously. The RN 1410 may then generate $X_R$ data 1443 and transmit an ACK 1444 to the BS 1405 and an ACK 1445 to WTRU2 1420. The RN 1410 may then generate $X_R$ data 1446.

In a third time slot 1450, the RN 1410 may broadcast $X_R$ data 1451. Upon reception of the $X_R$ data 1451, the BS 1405 may decode 1452 a portion of the $X_R$ data 1451 that was intended for the BS 1405 and transmit an ACK 1453 to the RN 1410. Upon reception of the $X_R$ data 1451, WTRU1 1415 may decode 1454 a portion of the $X_R$ data 1451 that was intended for WTRU1 1415 and transmit an ACK 1455 to the RN 1410. Upon reception of the $X_R$ data 1451, WTRU2 1420 may decode 1456 a portion of the $X_R$ data 1451 that was intended for WTRU2 1420 and transmit an ACK 1457 to the RN 1410. Once all the ACKs are received, the RN 1410 may transmit a beacon 1460.

Figure 15A:
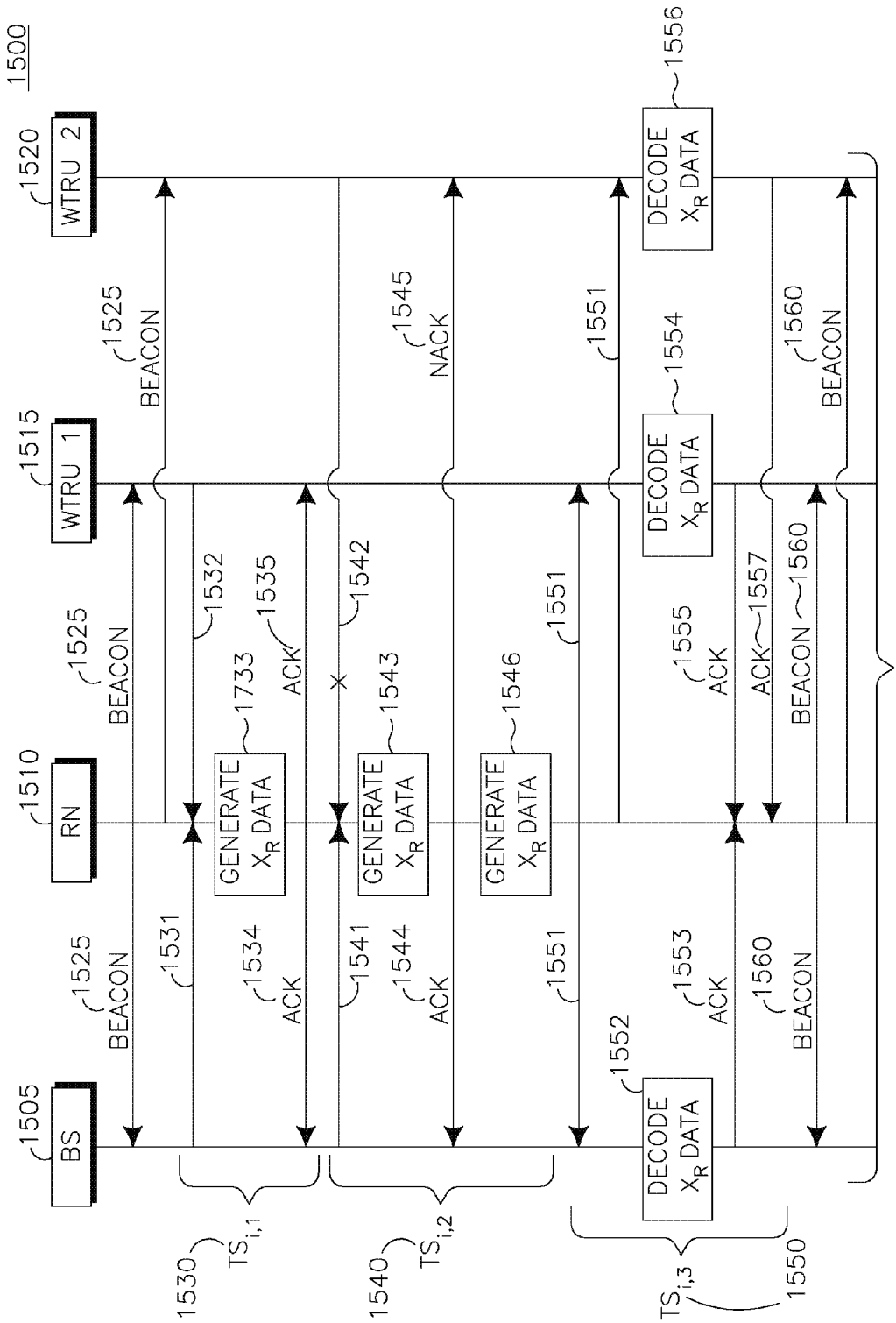

FIGS. 15a and 15b are a signal diagram 1500 of an example two-way relay transmission where one downlink transmission fails. This example relay scheme may involve a BS 1505, an RN 1510, a first WTRU (WTRU1) 1515, and a second WTRU (WTRU2) 1520, where the RN 1510 may transmit a beacon 1525.

In a first time slot 1530, the RN 1510 may receive a signal 1531 from the BS 1505 and a signal 1532 from WTRU1 1515. The RN 1510 may receive these signals simultaneously. The RN 1510 may then generate $X_R$ data 1533 and transmit an ACK 1534 to the BS 1505 and an ACK 1535 to WTRU1 1515. The RN may adopt a transmitter structure, as shown in FIG. 5, to generate the $X_R$ data 1533.

In a second time slot 1540, the RN 1510 may receive a signal 1541 from the BS 1505, however a signal 1542 from WTRU2 1520 may not be received. The RN 1510 may then generate $X_R$ data 1543 and transmit an ACK 1544 to the BS 1505 and an NACK 1545 to WTRU2 1520. The RN 1510 may then generate $X_R$ data 1546.

In a third time slot 1550, the RN 1510 may broadcast $X_R$ data 1551. Upon reception of the $X_R$ data 1551, the BS 1505 may decode 1552 a portion of the $X_R$ data 1551 that was intended for the BS 1505 and transmit an ACK 1553 to the RN 1510. Upon reception of the $X_R$ data 1551, WTRU1 1515 may decode 1554 a portion of the $X_R$ data 1551 that was intended for WTRU1 1515 and transmit an ACK 1555 to the RN 1510. Upon reception of the $X_R$ data 1551, WTRU2 1520 may decode 1556 a portion of the $X_R$ data 1551 that was intended for WTRU2 1520 and transmit an ACK 1557 to the RN 1510. Once all the ACKs are received, the RN 1510 may transmit a beacon 1560.

In a fourth time slot 1570, the RN 1510 may receive a signal 1571 from the BS 1505 and a signal 1572 from WTRU1 1515. The RN 1510 may receive these signals simultaneously. The RN 1510 may then generate $X_R$ data 1573 and transmit an ACK 1574 to the BS 1505 and an ACK 1575 to WTRU1 1515.

In a fifth time slot 1580, the RN 1510 may receive a signal 1581 from the BS 1505 and a retransmission signal 1582 from WTRU2 1520. These signals may be received simultaneously. The RN 1510 may then generate $X_R$ data 1583 and transmit an ACK 1584 to the BS 1505 and an ACK 1585 to WTRU2 1520. The RN 1510 may then generate $X_R$ data 1586.

In a sixth time slot 1590, the RN 1510 may broadcast $X_R$ data 1591. Upon reception of the $X_R$ data 1591, the BS 1505 may decode 1592 a portion of the $X_R$ data 1591 that was intended for the BS 1505 and transmit an ACK 1593 to the RN 1510. Upon reception of the $X_R$ data 1591, WTRU1 1515 may decode 1594 a portion of the $X_R$ data 1591 that was intended for WTRU1 1515 and transmit an ACK 1595 to the RN 1510. Upon reception of the $X_R$ data 1591, WTRU2 1520 may decode 1596 a portion of the $X_R$ data 1591 that was intended for WTRU2 1520 and transmit an ACK 1597 to the RN 1510. Once all the ACKs are received, the RN 1510 may transmit a beacon 1598.

Figure 16:
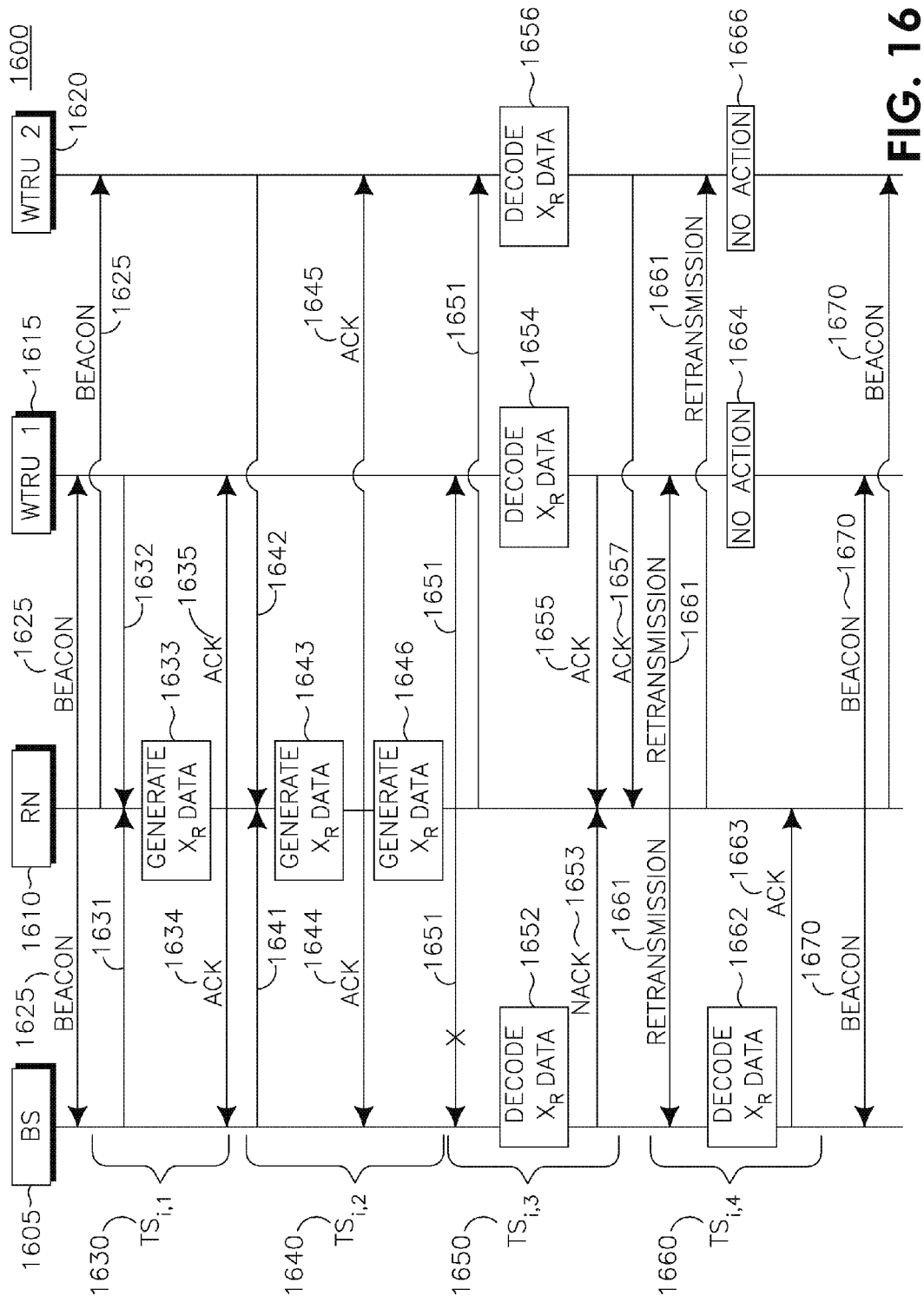
FIG. 16 is a signal diagram of an example two-way relay transmission where one uplink transmission fails.

FIG. 16 is a signal diagram 1600 of an example two-way relay transmission where one uplink transmission fails. This example relay scheme may involve a BS 1605, an RN 1610, a first WTRU (WTRU1) 1615, and a second WTRU (WTRU2) 1620, where the RN 1610 may transmit a beacon 1625.

In a first time slot 1630, the RN 1610 may receive a signal 1631 from the BS 1605 and a signal 1632 from WTRU1 1615. The RN 1610 may receive these signals simultaneously. The RN 1610 may then generate $X_R$ data 1633 and transmit an ACK 1634 to the BS 1605 and an ACK 1635 to WTRU1 1615.

In a second time slot 1640, the RN 1610 may receive a signal 1641 from the BS 1605 and a signal 1642 from WTRU2 1620. The RN 1610 may receive these signals simultaneously. The RN 1610 may then generate $X_R$ data 1643 and transmit an ACK 1644 to the BS 1605 and an ACK 1645 to WTRU2 1620. The RN 1610 may then generate $X_R$ data 1646.

In a third time slot 1650, the RN 1610 may broadcast $X_R$ data 1651. In this example, the BS 1605 may not receive $X_R$ data 1651, and may decode 1652 in error and transmit a NACK 1653 to the RN 1610. Upon reception of the $X_R$ data 1651, WTRU1 1615 may decode 1654 a portion of the $X_R$ data 1651 that was intended for WTRU1 1615 and transmit an ACK 1655 to the RN 1610. Upon reception of the $X_R$ data 1651, WTRU2 1620 may decode 1656 a portion of the $X_R$ data 1651 that was intended for WTRU2 1620 and transmit an ACK 1657 to the RN 1610.

In a fourth time slot 1660, the RN 1610 may broadcast a retransmission of the $X_R$ data 1661. Upon reception of the retransmitted $X_R$ data 1661, the BS 1605 may decode the retransmitted $X_R$ data 1661 and transmit and ACK 1663 to the RN 1610. Upon reception of the retransmitted $X_R$ data 1661, WTRU1 1615 may take no action 1664 and wait for a beacon 1670 transmission from the RN 1610. Upon reception of the retransmitted $X_R$ data 1661, WTRU2 1620 may take no action 1666 and wait for a beacon 1670 transmission from the RN 1610.

Note that all zero bits that may be used in the XOR coding during an RN broadcast when any downlink transmission error occurs. The zeroes may be replaced with a pseudo random bit sequence in order to preserve the benefit of data privacy.

The examples described above may be applied in an ideal case of synchronous HARQ procedure, for example where acknowledgements may be immediately available before the next time slot, and retransmissions may be scheduled for predetermined, in some cases immediately next, time slots. In some applications, retransmission opportunities and ACK/NACKs may only become available after several time slots due to processing delay.

In synchronous HARQ, ACK/NACKs may become available after a fixed number of time slots, and retransmission opportunities may be scheduled a fixed number of time slots later. This may be an efficient mode of operation since there is no need to attach an address or process ID to the acknowledgement and retransmission, and that the receivers may know when to expect data. Multiple relaying cycles and their HARQ processes may be pipelined to accommodate the number of slots needed for acknowledgements and retransmission.

The HARQ scheme may be applied to a general synchronous application, where the round-trip time (RTT) may be a fixed number of time slots. The RTT may also dictate the number of parallel HARQ processes needed and their scheduling. Each uplink retransmission may extend the relaying cycle by inserting an additional time slot, and the next HARQ process may be delayed by one or more RTT time slots.

Figure 17:
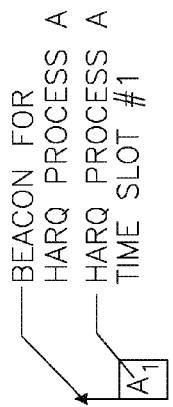
FIG. 17 is a diagram of example time slot schedules for four HARQ processes when round trip time (RTT)=4.
Figure 17:
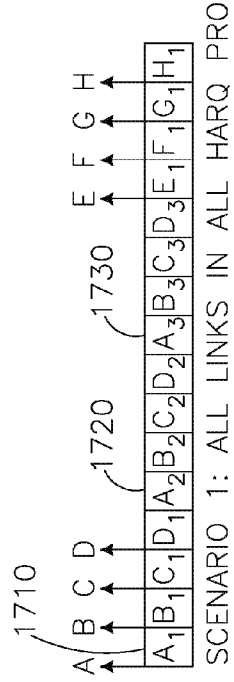
Figure 17:
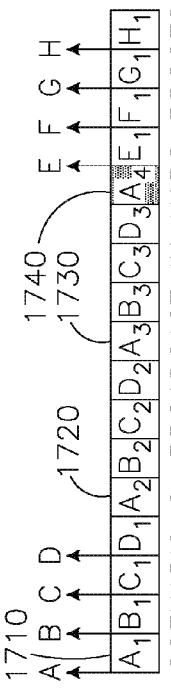
Figure 17:
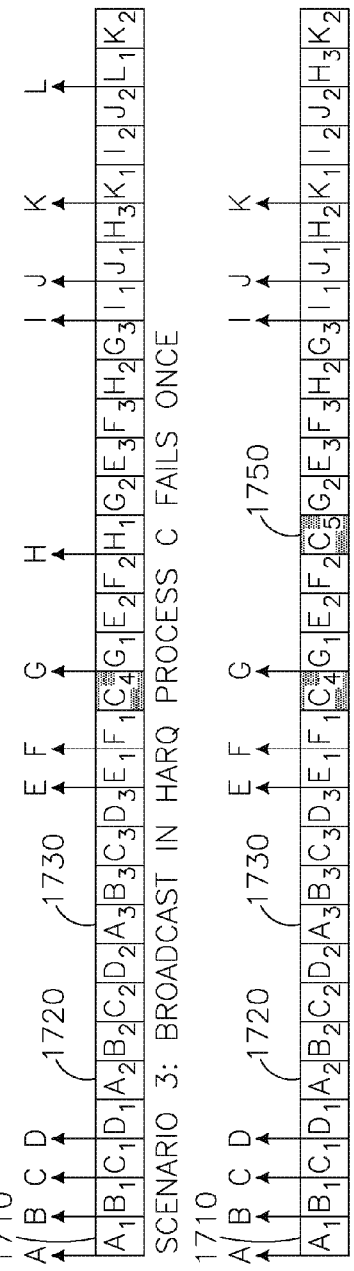

FIG. 17 is a diagram of some example scheduling scenarios 1700 of the HARQ processes for 2 WTRUs and where the RTT=4. In any 4 consecutive time slots, 4 HARQ processes, may be interleaved to accommodate RTT=4. Each relaying cycle may include 3 time slots, for example, $A_1$ 1710, $A_2$ 1720, and $A_3$ 1730, and each uplink retransmission may extend the cycle with another time slot, for example, $A_4$ 1740, $C_5$ 1750, etc. With this example scheduling approach, no time slot is wasted, and RTT=4 may be satisfied for all HARQ processes.

In this HARQ scheme, when there is a retransmission, data packets at the destination may be received out of order. Resequencing may be necessary if the data packets are received out of order. The example above may be extended to any RTT and any number of WTRUs.

The proposed HARQ scheme may also be applied in asynchronous applications. In asynchronous operation, acknowledgement or retransmission may not arrive at expected RTT time slots. The receiver may continuously monitor the data and the messages, or the data may have a process ID attached to them.

Table 3 summarizes the information related to HARQ that may be carried in the control channels. Some of the information may be carried in the beacon for RN.

TABLE 3

Control Channel Fields

| Field Name | Number of Bits |
|---|---|
| HARQ process ID | ceil(log2(number of HARQ processes)) |
| RN only: Time slot scheduling | sizeOf(UEID) * (number of Ues + 1) |
| Link acknowledgement | 1 bit: ACK or NACK |
| Asynchronous HARQ only: link acknowledgement ID | ceil(log2(number of HARQ processes)) |
| Destination acknowledgement | 1 bit: ACK or NACK |
| Asynchronous HARQ only: destination acknowledgement ID | ceil(log2(number of HARQ processes)) |
| RN only: broadcast modulation | 1 bit: QAM or Hierarchical Modulation<br>1 bit: LSB or MSB |
| Redundancy version | ceil(log2(number of RVs)) |
| Modulation order | ceil(log2(number of constellations)) |
| New data indicator (NDI) | 1 bit |

The network coding scheme may assume that the data packets from all nodes are of the same size in order to perform the XOR operation. In an example where this assumption is not satisfied, the payload data may be padded with dummy bits to form data packets of identical size. Alternatively, the redundant bits from a Reed-Solomon encoder may be used as the padding bits. Such a design may utilize the extra coding gain of a Reed-Solomon code to achieve better reliability for the payload data. The data packet may be recovered for use in the XOR network coding as long as the payload data can be correctly decoded.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless communication method for relay transmission, the method comprising:
   receiving, in a first time slot, a first signal from a base station (BS) and a second signal from a first wireless transmit/receive unit (WTRU);
   receiving, in a second time slot, a third signal from the BS and a fourth signal from a second WTRU;
   decoding the received signals from the BS, the first WTRU, and the second WTRU;
   generating a plurality of intermediate bit sequences (IBS)s, wherein the plurality of IBSs are generated based on a combination of bits from the second and fourth received signals, and wherein the plurality of IBSs are generated by substituting a plurality of decoded bits in the received signals with a plurality of predetermined bits;
   arranging the bits of each of the plurality of IBSs into a plurality of symbols, wherein each of the plurality of symbols comprises one bit from each of the plurality of IBSs; and
   broadcasting the plurality of symbols in a third time slot.

2. The method of claim 1 further comprising:
   receiving, in an N time slot, an Nth signal from an Nth WTRU, wherein N is greater than two; and
   broadcasting the plurality of symbols in a N+1 time slot.

3. The method of claim 1 further comprising:
   performing a detection to enable an estimation of the received signals in any time slot.

4. The method of claim 3, wherein the estimation performed is a maximum-likelihood (ML) estimation or a Successive Interference Cancellation (SIC) estimation.

5. The method of claim 1 further comprising:
   applying a physical (PHY) layer network coding to the received signals, wherein the PHY layer network coding is exclusive-OR (XOR) network coding.

6. The method of claim 1 further comprising:
   applying hierarchical modulation (HM) to the decoded signals on a condition that at least one packet in each time slot is received successfully.

7. The method of claim 1, wherein the received signals include an indicator that indicates a channel condition.

8. The method of claim 7, wherein the indicator is a channel quality indicator (CQI) and indicates an instantaneous SINR.

9. The method of claim 1, wherein the plurality of IBSs are grouped together to create a grouped IBS (IBSR), wherein the IBSR is grouped by ordering signal-to-interference noise ratios (SINR)s of a plurality of relay node (RN)-WTRU channels in an ascending order, such that $SINR[1] < SINR[2] < \ldots < SINR[N]$.

10. The method of claim 1, wherein on a condition that any received signal is not decoded correctly, the plurality of predetermined bits are known to the BS, the first WTRU, and the second WTRU.

11. The method of claim 10 further comprising:
on a condition that a NACK is received or a failure to receive an ACK, receiving a retransmitted signal from the BS, the first WTRU, or the second WTRU; and
retransmitting the IBSs.

12. The method of claim 1 further comprising:
transmitting an acknowledgement (ACK) or a negative acknowledgement (NACK) based on the success or failure in decoding the received signals.

13. The method of claim 1, further comprising:
receiving an acknowledgement (ACK) or a negative acknowledgement (NACK) from the BS, wherein the ACK or the NACK indicates whether the IBSs were received correctly at the BS.

14. The method of claim 13, further comprising:
transmitting a destination acknowledgement (ACK) or negative acknowledgement (NACK) based on the acknowledgement (ACK) or negative acknowledgement (NACK) received from the base station (BS), the first WTRU, and the second WTRU.

15. The method of claim 14, wherein any failed decoding of an ACK is regarded as a NACK.

16. A relay node (RN) comprising:
a receiver configured to receive, in a first time slot, a first signal from a base station (BS) and a second signal from a first wireless transmit/receive unit (WTRU) and to receive, in a second time slot, a third signal from the BS and a fourth signal from a second WTRU;
a processor configured to:
decode the received signals from the BS, the first WTRU, and the second WTRU; and
generate a plurality of intermediate bit sequences (IBS)s based on a combination of bits from the second and fourth received signals, wherein the plurality of IBSs are generated by substituting a plurality of decoded bits in the received signals with a plurality of predetermined bits; and
arrange the bits of each of the plurality of IBSs into a plurality of symbols, wherein each of the plurality of symbols comprises one bit from each of the plurality of IBSs; and
a transmitter configured to broadcast the plurality of symbols in a third time slot.

* * * * *